United States Patent [19]

Klun et al.

[11] Patent Number: 4,855,184

[45] Date of Patent: Aug. 8, 1989

[54] RADIATION-CURABLE PROTECTIVE COATING COMPOSITION

[75] Inventors: Thomas P. Klun; David D. Lu; Aida F. Robbins, all of St. Paul, Minn.

[73] Assignee: Minnesota Mining and Manufacturing Company, St. Paul, Minn.

[21] Appl. No.: 151,693

[22] Filed: Feb. 2, 1988

[51] Int. Cl.$^4$ .................... C08B 15/06; C08B 15/10
[52] U.S. Cl. .................... 428/425.1; 427/331; 427/393; 428/534; 522/88; 522/89; 524/31; 527/301; 527/302
[58] Field of Search ............ 527/301, 302; 522/89, 522/88; 427/331, 393; 428/414, 425.1, 534; 524/31

[56] References Cited

U.S. PATENT DOCUMENTS

| | | | |
|---|---|---|---|
| 2,933,463 | 4/1960 | Novak | 527/301 |
| 2,993,015 | 7/1961 | Novak | 527/301 |
| 3,245,827 | 4/1966 | Weber | 527/301 |
| 3,749,592 | 7/1973 | Gaske et al. | 117/62 |
| 3,782,950 | 1/1974 | Ranz et al. | 96/85 |
| 3,876,432 | 4/1975 | Carlick et al. | 96/115 P |
| 4,082,634 | 4/1978 | Chang | 204/159.15 |
| 4,134,809 | 1/1979 | Pacifici et al. | 204/159.12 |
| 4,147,603 | 4/1979 | Pacifici et al. | 204/159.12 |
| 4,224,369 | 9/1980 | Borden et al. | 428/203 |
| 4,295,947 | 10/1981 | Ohtani et al. | 204/159.15 |
| 4,308,119 | 12/1981 | Russell | 204/159.12 |
| 4,404,347 | 9/1983 | Nakamura | 527/301 |
| 4,565,857 | 1/1986 | Grant | 527/301 |
| 4,654,233 | 3/1987 | Grant et al. | 427/379 |
| 4,656,202 | 4/1987 | Nason et al. | 522/89 |

FOREIGN PATENT DOCUMENTS 48091 4/1975 Japan .
221474 9/1987 Japan .

OTHER PUBLICATIONS

"Formulating Ultraviolet Curable Coatings", Modern Paint and Coatings, vol. 73, No. 8, 1983.
"UV Cured Coatings for Wood Furniture", Radiation Curing, Nov. 1983, pp. 14–17.

*Primary Examiner*—Lewis T. Jacobs
*Assistant Examiner*—A. H. Koeckert
*Attorney, Agent, or Firm*—D. M. Sell; W. N. Kirn; C. Truesdale

[57] ABSTRACT

Normally solid, organic solvent-soluble, thermoplastic, polyethylenically-unsaturated, cellulosic polyurethane polymers are provided. These cellulosic polyurethane polymers comprise one or more cellulose ether or ester segments, one or more alkylene moieties having at least two carbon atoms and which can be substituted or interrupted by ether oxygen atoms, ester groups, or phenylene groups, two or more residues of diisocyanates, the segments, moieties, and residues being linked together by linking groups with the proviso that said alkylene moieties contain sufficient ethylenic unsaturation that said polymer can be crosslinked to a solvent-insoluble state. The cellulosic polyurethane polymers can be obtained by the polymerization of a reaction mixture comprising (a) aliphatic or cycloaliphatic diol comprising sufficient ethylenically-unsaturated diol to permit crosslinking of the polymerization product to a solvent-insoluble state; (b) organic solvent-soluble cellulose ether or ester having residual unreacted cellulosic hydroxyl groups; and (c) organic diisocyanate. The reaction product may optionally also contain primary or secondary aliphatic or aromatic diamines or dithiols. Also provided are coating compositions and shaped articles and methods for preparing same.

45 Claims, No Drawings

RADIATION-CURABLE PROTECTIVE COATING COMPOSITION

This invention relates to protective, organic coatings for wood and other substrates. This invention, in another aspect, relates to radiation-curable thermoplastic coating compositions which can be radiation-cured to form a durable solvent-resistant coating, to a method of preparing the coating composition, to a substrate bearing the coating composition, and to a method of coating the substrate.

Protective coatings for wood and various other solid substrates are well known and a wide variety of coating compositions have been used in the past. Some protective coatings serve a number of different purposes such as providing abrasion and scratch resistance and protection against water spotting and solvent damage. Two important types of protective coatings are lacquer-type coatings and reactive-type coatings.

Lacquer-type coating compositions are provided as a solvent solution of solid thermoplastic resins, either naturally occurring resins, e.g., shellac, or synthetic resins, e.g., nitrocellulose. The lacquer-type coating is obtained by coating a substrate with the resin solution and allowing the solvent to evaporate. By using these lacquer-type coating compositions, coatings are obtained that can, in many cases, be sanded, buffed, and polished. The coating, even though it may be somewhat abrasion resistant, is still soluble in certain solvents and therefore readily damaged by solvent.

The reactive-type coating compositions are provided as one or more compounds, oligomers, or polymers which contain polymerizable or reactive functional groups such as ethylenic unsaturation, e.g., acrylate or methacrylate groups, epoxy, isocyanate, carboxylic acid, and hydroxyl groups, that can react to chain-extend and/or crosslink to form the protective coating. In some cases, the reaction can take days before the coating has achieved the desired hardness or degree of cure. Compositions containing polymerizable ethylenic unsaturation can be cured by heat or radiation, e.g., ultraviolet light or electron beam radiation. Such compositions cured by ultraviolet light require the presence of a photoinitiator, while those cured with electron beam radiation do not require a photoinitiator. Radiation cured coatings often take only seconds or minutes to cure to yield the final desired properties.

For example, E. Levine in "Formulating Ultraviolet Curable Coatings" (*Modern Paint and Coatings*, vol. 73, no. 8, 1983, pp. 26–29) discloses radiation curable coatings which contain reactive oligomers, e.g., acrylated epoxies, urethanes, polyesters, and acrylics, multifunctional acrylate and methacrylate monomers, and monofunctional monomers. R. S. Bailey in "UV Cured Coatings For Wood Furniture" (*Radiation Curing*, November 1983, pp. 14–17) mentions unsaturated polyesters and acrylics as UV curable coatings.

U.S. Pat. No. 3,749,592 (Gaske et al.) discloses a radiation curable coating composition of the addition reaction product of a hydroxy functional lacquer grade resin, such as nitrocellulose and hydroxyethyl cellulose, and an ethylenically-unsaturated monoisocyanate.

U.S. Pat. No. 3,782,950 (Ranz et al.) discloses photographic layers containing a light-sensitive cyclic aryl polycarboxylic acid imide and a compound having at least one olefinic double bond or having groups capable of forming olefinic bonds upon exposure to light. The compound having at least one olefinic double bond may be a hydroxy alkyl cellulose substituted with acryloyl or methacryloyl groups.

U.S. Pat. No. 4,082,634 (Chang) discloses B-stage polyurethanes which are the reaction product of a polyester polyol, an organic diisocyanate, and at least one hydroxyl-containing ester having a terminal acryloyl or alpha-substituted acryloyl group.

U.S. Pat. No. 4,134,809 (Pacifici et al.) discloses radiation curable cellulose ester-acrylate compositions which contain a carboxylated cellulose ester, a glycidyl acrylate or methacrylate and a photoinitiator.

U.S. Pat. No. 4,147,603 (Pacifici et al.) discloses radiation curable coating compositions of curable cellulose esters, particularly cellulose esters containing a $\beta$-alkyl amino or $\beta$-arylamino carboxylate moiety, dissolved in unsaturated monomer and containing a photoinitiator.

U.S. Pat. No. 4,224,369 (Borden et al.) discloses coating compositions which contain urethane derivatives of acrylated epoxidized soybean oil, which is the reaction product of epoxidized soybean oil with acrylic acid or methacrylic acid, and produced by the reaction of acrylated epoxidized soybean oil with an organic isocyanate.

U.S. Pat. No. 4,295,947 (Ohtani et al.) discloses a photo-curable coating composition for building materials which contains an isocyanate-modified epoxy ester obtained by the reaction of an acrylic or methacrylic ester of an epoxy compound having not less than two epoxy groups in the molecule with a polyisocyanate, a photopolymerizable monomer being copolymerizable with the epoxy ester, a ketone resin, a photo-sensitizer, and a sensitizing auxiliary.

U.S. Pat. No. 4,308,119 (Russell) discloses an actinic radiation curable coating of a pentaerythritol-based polyacrylate or polymethacrylate, a cellulose ester and a photoinitiator.

U.S. Pat. No. 4,565,857 (Grant) discloses ethylenically-unsaturated cellulose esters which are the reaction product of a cellulose ester having unreacted hydroxyl groups and a polymerizable ethylenically-unsaturated compound having an isocyanato group reactive with the hydroxyl groups of the cellulose ester.

U.S. Pat. No. 4,654,233 (Grant et al.) discloses a coating composition which is a blend of (a) an ethylenically-unsaturated polyester which is the condensation or addition product of a polyhydroxy polyester, the polyhydroxy polyester being the reaction product of at least one organic diepoxide and at least one saturated or unsaturated dicarboxylic acid, and a polymerizable ethylenically-unsaturated compound and (b) an ethylenically-unsaturated thermoplastic polymer such as that disclosed in Grant '857.

U.S. Pat. No. 4,656,202 (Nason et al.) discloses acrylated cellulosic furniture coating compositions which comprise about 50 to about 85% by weight of an ultraviolet curable (meth)acrylated cellulosic polymer which is the reaction product of a cellulose acetate carboxylate and an isocyanato acrylate, about 15 to about 45% by weight of an ultraviolet reactive, polyacrylated oligomer, such as acrylated urethanes, alkyds, polyesters, polyamides, and epoxy resins, from 0.1 to about 10% by weight of an ultraviolet photoinitiator, and sufficient solvent to permit application of the coating to the desired substrate.

Coatings such as these radiation curable coatings are useful in providing various degrees of protection against solvents, stains and abrasion, but many suffer from one or more disadvantages. For example, some coatings prepared from blends of ethylenically-unsaturated oligomers and monomers are wet or tacky after coating and thus are susceptible to the pickup of dust particles or foreign matter until crosslinked by radiation. Such coatings do not have a thermoplastic stage that can be sanded and polished. After crosslinking, imperfections which may be present in the insoluble, radiation cured, hard coatings are difficult to correct such as by sanding and buffing, and defects cannot be repaired by removal of the coating by solvents.

Although some of these coatings can be physically worked for various purposes which are conventional to the lacquer art and which can thereafter be exposed to radiation to cure the film to increase the solvent resistance and physical toughness of the film and thereby produce a more durable film, there is need for coatings that provide still better characteristics. Furthermore, the coating compositions may require the use of ethylenically-unsaturated isocyanates or low molecular weight ethylenically-unsaturated monomers that can cause toxicological problems.

Other deficiencies in many known protective coatings are darkness of coating color and/or lack of clarity, because the coatings include components which are colored or develop color on curing, or are incompatible, i.e., not mutually soluble, with each other.

The present invention provides normally solid, organic solvent-soluble, thermoplastic, polyethylenically-unsaturated, cellulosic polyurethane polymers comprising one or more cellulose ether or ester segments, $R^c$, one or more alkylene moieties, $R^d$, having at least two carbon atoms and which can be substituted, or interrupted, by ether oxygen atoms, —O—, ester groups,

and phenylene groups, and two or more residues of diisocyanates, $R^i$, said residues being diisocyanates devoid two —NCO radicals, and said segments, moieties, and residues being linked together by linking groups, said linking groups being carbamato, i.e.,

and, optionally urylene, i.e.,

or thiocarbamato, i.e.,

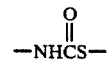

with the proviso that a sufficient amount of $R^d$ be ethylenically-unsaturated to permit crosslinking of the polymer to a solvent insoluble state.

The present invention further provides a method for providing a substrate, such as wood, e.g., furniture and paneling, with a protective coating comprising applying to a substrate an organic solvent solution of the above-described thermoplastic polyethylenically-unsaturated, cellulosic polyurethane polymer, drying the coating composition to remove solvent, and crosslinking the dried coating with heat, actinic radiation, e.g., ultraviolet, radiation, or ionizing radiation. The dried coating can be tack-free and may optionally be physically worked, sanded or polished, e.g., to smooth or repair an inadvertently damaged, dried coating, prior to crosslinking.

The present invention still further provides substrates, such as wood, e.g., furniture and paneling having a protective, cured, crosslinked, cellulosic polyurethane polymer coating which is solvent resistant, abrasion resistant, heat resistant, and stain resistant.

The present invention further provides shaped articles such as molded or extruded articles prepared from the above-described polyethylenically-unsaturated cellulosic polyurethane polymer and a method for preparing such shaped articles.

The normally solid, organic solvent-soluble thermoplastic, polyethylenically-unsaturated, cellulosic polyurethane polymers can be obtained by the polymerization of a reaction mixture comprising (a) aliphatic or cycloaliphatic diol comprising sufficient ethylenically-unsaturated diol to permit crosslinking of the polymerization product to a solvent-insoluble state; (b) organic solvent-soluble cellulose ether or ester having residual unreacted cellulosic hydroxyl groups; and (c) organic diisocyanate. The ethylenically-unsaturated diol is preferably present in an amount of at least about 5 weight percent of said aliphatic or cycloaliphatic diol is preferably a polyethylenically-unsaturated diol. The diols are aliphatic or cycloaliphatic diols which may contain an aromatic group, such as bis-1,4-(hydroxyethoxy)benzene, i.e., that portion of the diol adjacent the hydroxyl group must be aliphatic or cycloaliphatic.

A portion of the diol, generally about 0 to 95 weight percent, can be long-chain aliphatic group-modified diol. Optionally, some of the diol in the reaction mixture can be replaced by a primary or secondary aromatic diamine, an aliphatic or cycloaliphatic diamine and/or an aliphatic or cycloaliphatic dithiol. The amount of diamine and/or dithiol is preferably sufficiently low that an organic solvent solution of the reaction product does not gel. Generally, up to about 60 weight percent of the diol can be so-replaced by a primary or secondary aromatic diamine or by an aliphatic or cycloaliphatic diamine having a molecular weight above about 1000. Generally, up to about 40 weight percent of the diol can be replaced by an aliphatic or cycloaliphatic diamine having a molecular weight of about 300 to 1000 and up to about 20 weight percent of the diol can be replaced by an aliphatic or cycloaliphatic diamine having a molecular weight of less than about 300. Generally, up to about 50 weight percent of the diol can be replaced by an aliphatic or cycloaliphatic dithiol. When both dithiols and diamines are substituted for a portion of the diol, the amounts of dithiol and diamine must be proportionately reduced as can be appreciated by those skilled in the art. Generally, the total amount of combined dithiol and diamine can replace no more than 60 weight percent of the diol.

A class of cellulosic polyurethane polymers are polymers which comprise one or a plurality, e.g., about 1 to 20, preferably about 1 to 10, of units represented by formula I:

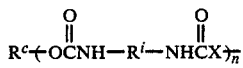

wherein
each $R^c$ is independently a cellulose ether or ester residue of an organic solvent-soluble cellulose ether or ester, said residue containing an amount of unreacted hydroxyl groups equal to about 0.01 to 30 weight percent, preferably 1 to 4 weight percent, minus an amount of hydroxyl groups equal to n;
each $R^i$ is independently the residue of an organic diisocyanate devoid its two isocyanate groups; and
n is a number having a value of at least 1, preferably 1 to 20, more preferably 1 to 10;
and one or a plurality, e.g., about 1 to 100, preferably about 10 to 60, of units represented by formula II:

wherein
$R^i$ is defined as above and each $R^d$ is independently the hydroxyl-free, amino-free, or thiol-free residue of an aliphatic or cycloaliphatic diol having a molecular weight of from 62 to 100,000 or more, aliphatic, cycloaliphatic, or aromatic diamine having a molecular weight of from 60 to 100,000 or more, or aliphatic or cycloaliphatic dithiol having a molecular weight of from 94 to 100,000, (which are termed precursor diol, diamine, or dithiol herein), which residue is devoid two hydroxy groups, two amino groups, or two thiol groups, respectively, and which can be substituted, for example, with ethylenically-unsaturated groups, and/or hydrocarbyl groups having 4 to 30 carbon atoms, with the proviso that $R^d$ is derived from a sufficient amount of the ethylenically-unsaturated diol that the polymer can be crosslinked to an organic solvent-insoluble state;
each X is independently —O—, —S—, or —NR— wherein R is hydrogen or lower alkyl having 1 to 6 carbon atoms.

Preferably, at least about 5 weight percent of the $R^d$ precursors are the ethylenically-unsaturated diol precursor. Generally, no more than 60 weight percent of the precursor is an aromatic diamine or aliphatic or cycloaliphatic diamine precursor having a molecular weight above 1000. Generally, no more than 40 weight percent of the precursors is an aliphatic or cycloaliphatic diamine precursor having a molecular weight of 300 and 1000. Generally, no more than 20 weight percent of the precursors is an aliphatic or cycloaliphatic diamine precursor having a molecular weight below 300.

Generally, no more than 50 weight percent of the $R^d$ precursors are aliphatic or cycloaliphatic dithiols and the total amount of the diamine and dithiol precursors is less than about 60 weight percent.

$R^i$ can be, for example,

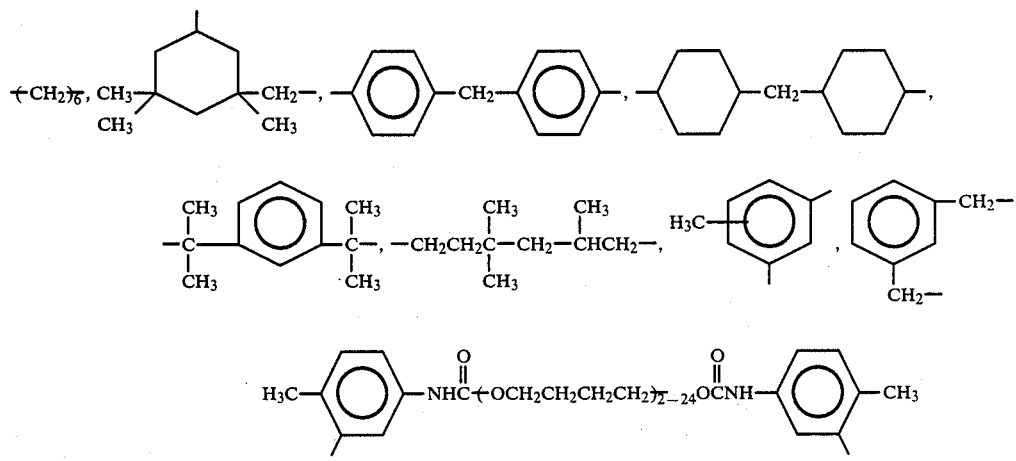

$R^d$ can be, for example,

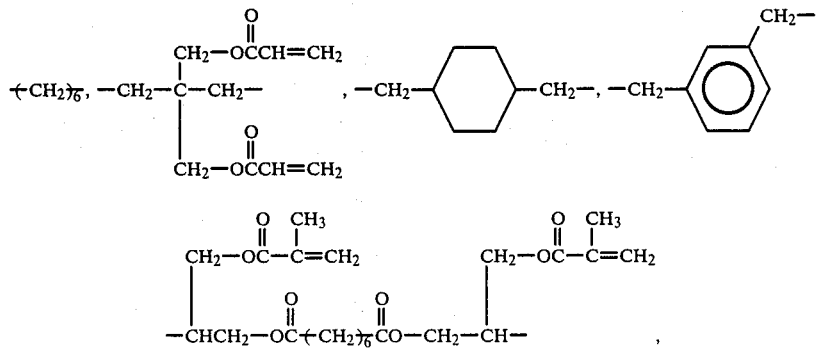

-continued
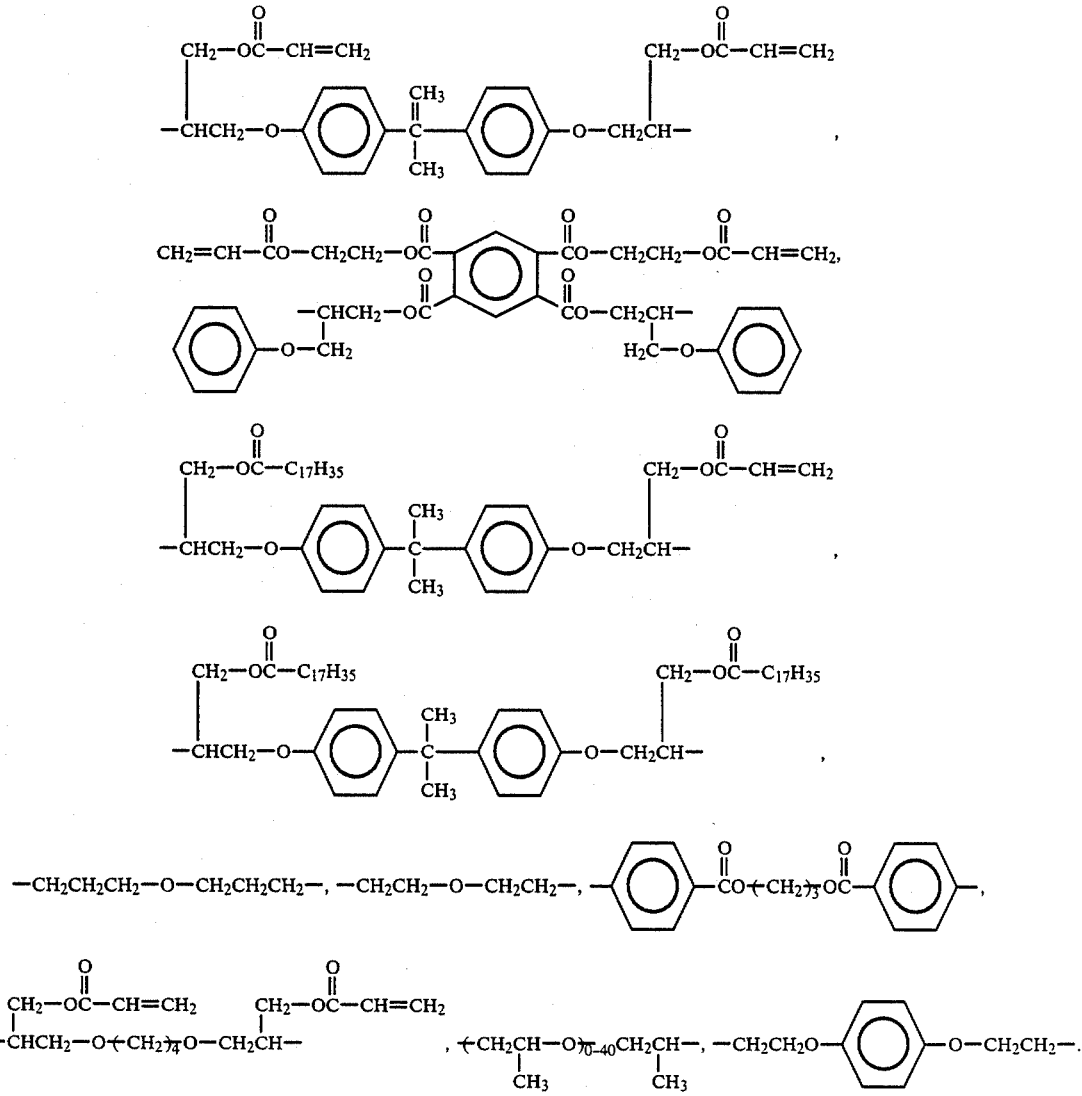
Preferably, each $R^c$ is independently the residue of an organic solvent-soluble cellulose ether or ester which can be represented by the formula
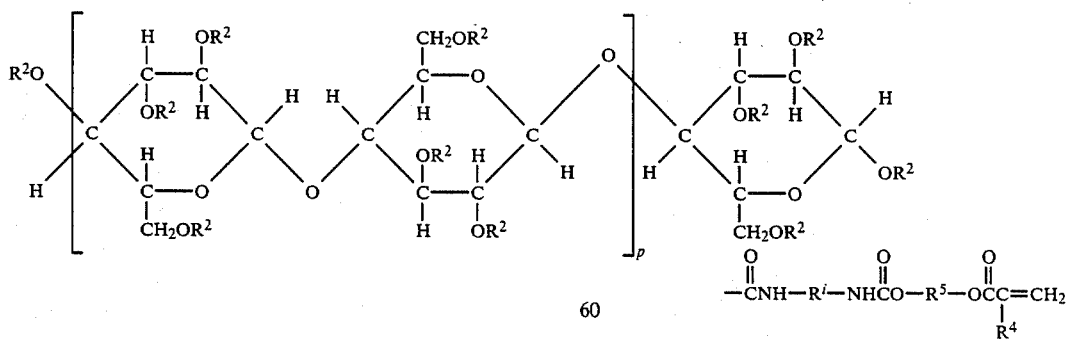
wherein each $R^2$ is independently selected from —H, —$R^3$,
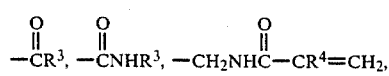
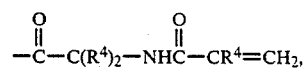
—$SO_2R^3$, and —$NO_2$, wherein $R^3$ is (1) a saturated aliphatic group which may be branched or cyclic having 1 to 20 carbon atoms and up to 3 non-adjacent oxygen atoms, such as, for example, methyl, ethyl, propyl, butyl, decyl, pentadecyl, hexadecyl, heptadecyl, octadecyl, methoxymethyl, ethoxyethyl, hydroxyethyl, carboxymethyl, and carboxyethyl, (2) an ethylenically-unsaturated organic group which may be branched or cyclic having 2 to 20 carbon atoms and which may be substituted with acryloyloxy and acrylamido groups such as ethenyl, 1-methylethenyl, 8,11-heptadecadienyl, the alkadienyl group from linoleic acid, methacryloyloxyethyl, and methacrylamidoethyl or (3) an 12 carbon atoms, and $R^i$ is as defined above, 0.01 to 30 weight percent, preferably 1 to 4 weight percent, of the $-OR^2$ groups are hydroxyl; and p is a number having a value from about 5 to 250, preferably about 5 to 50; with the proviso that said residue is devoid a number of $-OR^2$ equal to n when $R^2$ is $-H$; and n is as previously defined.

Typical chain segments of the thermoplastic polyethylenically-unsaturated cellulosic polyurethanes include

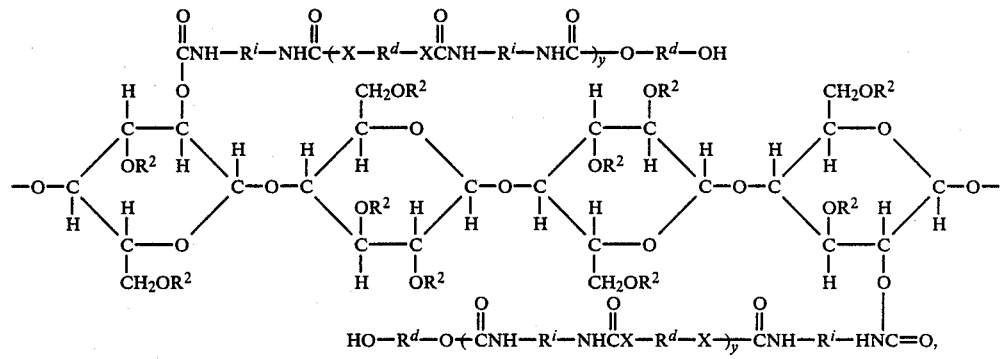

and

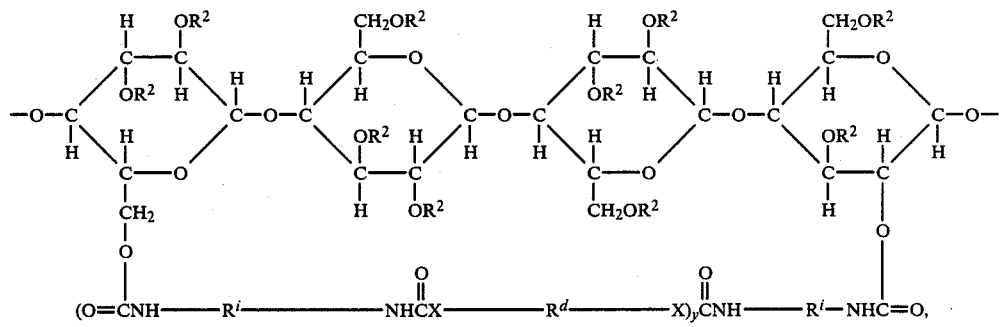

and

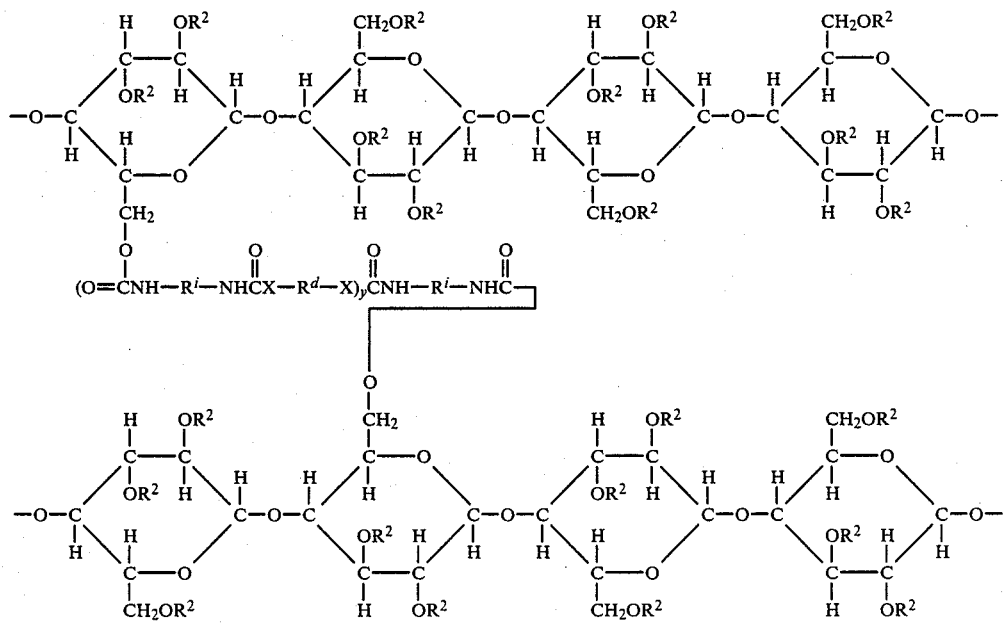

aryl group having 6 to 10 carbon atoms, $R^4$ is hydrogen or a methyl group, $R^5$ is an alkylene group having 2 to wherein $R^d$, $R^i$, $R^2$, X, and y are as defined above.

In the cellulosic polyurethane polymers of the invention, the terminal portions, or end groups, on the polymer chains are not critical and often can not be conclusively determined analytically. Generally, the end groups are selected from —OR$^d$OH, —OR$^1$,

in which R$^d$, R$^i$, and X are as defined above and R$^1$ is a lower alkyl group having 1 to 6 carbon atoms.

Although as little as one

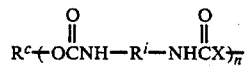

and one

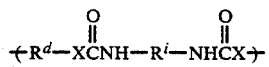

may be present in the cellulosic polyurethane polymer, the material is polymeric, rather than oligomeric, due to the presence of the polymeric R$^c$.

The diols that are useful in preparing the thermoplastic polyethylenically-unsaturated, cellulosic polyurethanes of the invention are any organic compound having two primary or secondary hydroxyl groups. One or more diols can be used. At least 5 weight percent of the diols are ethylenically-unsaturated diol. The diols are aliphatic or cycloaliphatic diols which can contain an aromatic group such as 1,4-bis-(2-hydroxyethoxy)benzene. The organic diols can be monomeric aliphatic diols having 2 to about 30 carbon atoms and may contain up to about 14 ether oxygen atoms and amide nitrogen atoms or the organic diols can be polymeric having a molecular weight as great as 100,000 or more.

Useful diols include, for example, poly(oxyalkylene)diols such as poly(oxyethylene)diol, poly(oxypropylene)diol, and poly(oxytetramethylene)diol; polyester diols such as poly(ethylene adipate)diol; poly(caprolactone)diols; and poly(carbonate)diols.

Preferably the ethylenically-unsaturated diols have an ethylenic unsaturation equivalent weight of less than about 1000. A preferred class of ethylenically-unsaturated diols is the reaction product of an ethylenically-unsaturated acid, alcohol, or phenol with a polyepoxide, particularly a diepoxide. Such a reaction can be represented by the following reaction scheme:

group having 1 to 20 carbon atoms and up to 3 ether oxygen atoms or carbonyloxy groups, an aromatic group having 6 to 20 carbon atoms, or a covalent bond;

each R$^9$ is hydrogen or a lower alkyl group having 1 to 4 carbon atoms or an R$^9$ together with atoms in R$^8$ or another R$^9$ and the atoms to which both R$^8$ and R$^9$ are attached form a 5- or 6-membered ring; and a is 0 or 1, with the proviso that when R$^7$ is a covalent bond, then a is 1.

Suitable ethylenically-unsaturated acids which can be used in preparing the ethylenically-unsaturated diols according to Scheme A include, for example, β-phenylacrylic acid, α-cyanoacrylic acid, acrylic acid, methacrylic acid, crotonic acid, cinnamic acid, and ester acids such as the half acrylic or methacrylic acid-half dicarboxylic acid esters of alkylene glycol, such as, for example, ethylene glycol half acrylic ester-half succinic ester.

Suitable ethylenically-unsaturated alcohols which can be used in preparing the ethylenically-unsaturated diols according to Scheme A include, for example, allyl alcohol, methallyl alcohol, and the ethylenically-unsaturated esters and ethers of aliphatic diols such a 2-allyloxyethanol, 2-acryloyloxyethanol, 3-methacryloxypropanol, and 2,4-pentadi-2,4-enol.

Suitable ethylenically-unsaturated phenols which can be used include, for example, 2-allylphenol, 4-allylphenol, and 2-acryloylphenol.

Suitable diepoxides which can be used in preparing the ethylenically-unsaturated diols according to Scheme A include, for example, the diglycidyl ethers of bisphenols such as catechol, resorcinol, hydroquinone, bis(4-hydroxyphenyl)methane and bis(4-hydroxyphenyl)dimethylmethane, the diglycidyl ethers of aliphatic and cycloaliphatic diols such as ethylene glycol, 1,4-butanediol, 1,4-but-2-enediol, bis(1,4-hydroxymethyl)cyclohexane, the diglycidyl ethers of poly(oxyethylene)diols, poly(oxypropylene)diols, and poly(oxytetramethylene)diols, the diglycidyl ethers of polyester diols such as poly(carbonate)diols, poly(caprolactone)diols, poly(ethylene adipate)diols, the diglycidyl esters of dibasic aromatic, aliphatic and cycloaliphatic acids such as phthalic acid, hexahydrophthalic acid, succinic acid, maleic acid, itaconic acid, glutaric acid, adipic acid, and oxydipropionic acid, and carbocyclic diepoxides such as bis(2,3-epoxycyclopentyl) ether and 3,4-epoxy-6-methylcyclohexylmethyl 4-epoxy-6-methylcyclohexanecarboxylate. Examples of other diepoxides can be found in Lee and Neville, *Handbook of Epoxy Resins*, McGraw-Hill Book Co., 1967.

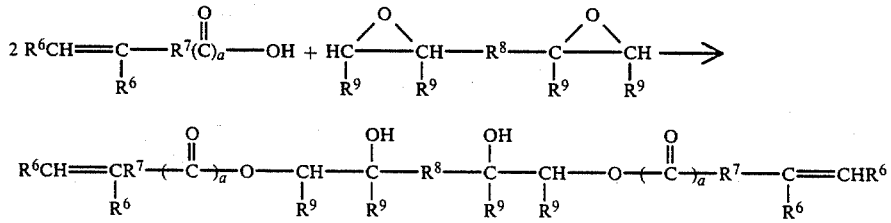

wherein each R$^6$ is independently hydrogen, halogen, cyano, lower alkyl having 1 to 4 carbon atoms, or phenyl;

each R$^7$ and R$^8$ is independently a divalent linear, branched, or cyclic saturated or unsaturated aliphatic Another preferred class of ethylenically-unsaturated diols is the reaction product of an ethylenically-unsaturated epoxide with an organic dicarboxylic acid, diol, or dihydric phenol. Such a reaction can be represented by the following reaction scheme:

Scheme B

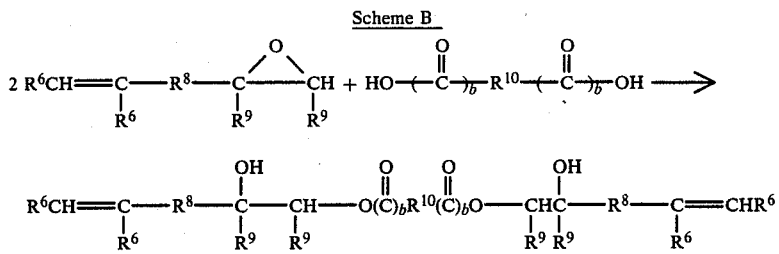

wherein
$R^6$, $R^8$, and $R^9$ are as defined above;
each $R^{10}$ is a saturated or unsaturated divalent alkyl group having 2 to 40 or more carbon atoms and up to 5 ether oxygen atoms or an aromatic group, preferably phenyl, having 6 to 14 carbon atoms; and
b is 0 or 1.

Suitable ethylenically-unsaturated epoxides which can be used in preparing the ethylenically-unsaturated diols according to Scheme B include, for example, allyl glycidyl ether, glycidyl acrylate, 1-ethenyl-1,2-epoxycyclohexane, and 3,4-epoxycyclohex-1-ene.

Suitable dicarboxylic acids which can be used in preparing the ethylenically-unsaturated diols according to Scheme B include, for example, succinic acid, maleic acid, itaconic acid, glutaric acid, adipic acid, oxydipropionic acid, phthalic acid, isophthalic acid, terephthalic acid, hexahydrophthalic acid, and dimer acids such as Hystrene TM 3695, available from Humko Sheffield Chemical Co.

Suitable diols and dihydric phenols which can be used in preparing the ethylenically-unsaturated diols according to Scheme B include, for example, those mentioned above as being suitable for use in preparing the ethylenically-unsaturated diols according to Scheme A.

A further preferred class of ethylenically-unsaturated diols is the reaction product of a monoepoxide with an ethylenically-unsaturated dicarboxylic acid which is the reaction product of an ethylenically-unsaturated alcohol with a dianhydride. Such a reaction can be represented by the following reaction scheme:

Scheme C

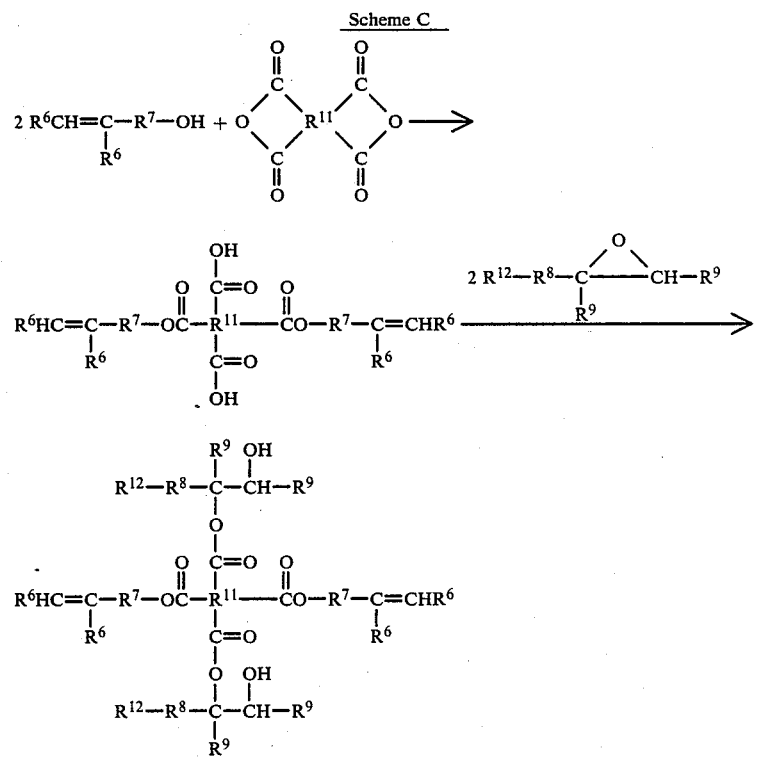

wherein
$R^6$, $R^7$, $R^8$, and $R^9$ are as defined above;
$R^{11}$ is a tetravalent alkane having 2 to 20 carbon atoms, a cycloalkyl-containing group having 5 to 20 carbon atoms or a tetravalent aryl-containing group having 6 to 20 carbon atoms, preferably a phenyl group; and
$R^{12}$ is hydrogen or a lower saturated or unsaturated alkyl group having 1 to 4 carbon atoms.

Suitable ethylenically-unsaturated alcohols which can be used in preparing the ethylenically-unsaturated diols according to Scheme C include, for example, those mentioned above for use in preparing the ethylenically-unsaturated diols according to Scheme A.

Suitable tetracarboxylic acid dianhydrides which can be used in preparing the ethylenically-unsaturated diols according to Scheme C include, for example, pyromellitic dianhydride, 1,2,4,5-cyclohexanetetracarboxylic- 1,2:4,5-dianhydride, 1,1,2,2-ethanetetracarboxylic-1,2:1,2-dianhydride, 1,2,3,4-butane-1,2,:3,4-dianhydride, 4,4'-methylenediphthalic anhydride, and 1,4,5,8-naphthalenetetracarboxylic-1,8:4,5-dianhydride. Additional suitable dianhydrides are disclosed in U.S. Pat. No. 4,417,045 (Nimry et al.) which is incorporated herein by reference for that purpose.

Suitable monoepoxides which can be used in preparing the ethylenically-unsaturated diols according to Scheme C include, for example, 2,3-epoxybutane, phenyl glycidyl ether, glycidyl acrylate and methacrylate, 1,2-epoxydodecane, 1,2-epoxycyclohexane, and methyl-1,2-cyclohexanecarboxylate.

The addition reaction of acids or phenols with epoxides, shown in each of Schemes A, B, and C, is well-known and is described, for example, in U.S. Pat. Nos. 2,824,851 (Hall) and 3,301,743 (Fekete et al.) which are incorporated herein by reference for that purpose. The reaction can be carried out in the absence or presence of solvents. Suitable solvents include, for example, butyl acetate, ethyl acetate, tetrahydrofuran, acetone, methyl ethyl ketone, hexane, toluene, and chloroform.

The reaction can be accelerated by the use of about 0.01 to 5 weight percent, based on the weight of the solids, of a catalyst such as a tertiary amine, an alkali metal hydroxide, an alkali metal salt of an organic acid, a chromium salt, a sulfonium compound, a phosphonium compound, a phosphine, an arsine, or a stibine.

The reaction can be carried out at a temperature of about 40° to 110° C. or higher. To prevent unintentional polymerization, the reaction can be conducted in the presence of about 0.001 to 0.1 weight percent of a polymerization inhibitor such as 4-methoxyphenol, 2,6-ditertiarybutylphenol and the like which are effective in the presence of oxygen, or phenothiazine and copper powder which are effective in the absence of oxygen, e.g., under nitrogen atmosphere. Other polymerization inhibitors are described, for example, in U.S. Pat. No. 4,162,274 (Rosenkranz), which is incorporated herein by reference for that purpose.

The addition reaction of aliphatic or cycloaliphatic alcohols to epoxides, as shown in each of Schemes A and B is also well-known and, generally, is carried out in the presence of a Lewis acid such as boron trifluoride etherate, stannic chloride, aluminum chloride, or a base such as potassium hydroxide, or a combination of palladium and copper chloride in the presence of oxygen.

In addition to the ethylenically-unsaturated aliphatic or cycloaliphatic diols whose preparation can be represented by Schemes A, B, and C, another class of diols useful in preparing the thermoplastic polyethylenically-unsaturated cellulosic polyurethanes of this invention are polyhydric alcohols such as, for example, those represented by the formulae

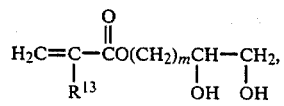

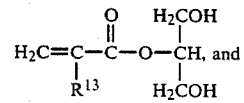

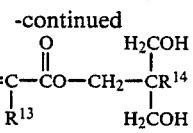

wherein $R^{13}$ is hydrogen or a methyl group, m is an integer of 1 to 4, and $R^{14}$ is hydrogen or a lower alkyl group having 1 to 4 carbon atoms as are disclosed in U.S. Pat. Nos. 4,366,301 (LeRoy) 4,578,504 (Hammar) and U.S. Pat. No. 3,210,327 (Gallano) which are incorporated herein by reference for that purpose. A further class of such polyhydric alcohols are those which can be represented by the formula

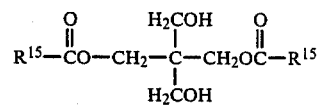

wherein $R^{15}$ is an unsaturated aliphatic group having 2 to 24 carbon atoms and which can be prepared, for example, by esterifying bis(5-hydroxymethyl)-1,3-dioxane represented by the formula

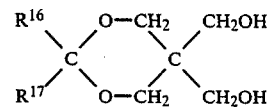

wherein $R^{16}$ is a lower alkyl group of 1 to 6 carbon atoms or phenyl, optionally substituted by an electron donating group, e.g., methyl, chloro, methoxy or dimethylamino group, and $R^{17}$ is independently hydrogen or $R^{16}$, with aliphatic carbonyl compounds represented by the formula

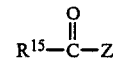

wherein Z is hydroxyl, halogen, alkoxy having 1 to 4 carbon atoms or

wherein $R^{15}$ is as defined above to provide a polyethylenically-unsaturated diorganic group-substituted 5,5-bis(hydroxymethyl)-1,3-dioxane ester having the general formula

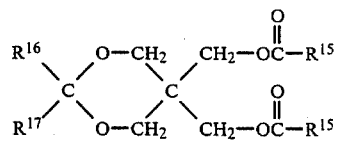

wherein $R^{15}$, $R^{16}$, and $R^{17}$ are as defined above and hydrolyzing the dioxane moiety of the dioxane ester to provide the polyethylenically-unsaturated diol.

A class of the optional long-chain aliphatic group-modified diols which can be used are, for example, the addition reaction products of a long-chain aliphatic carboxylic acid or alcohol having 4 to 30 carbon atoms and a diepoxide. Suitable long-chain aliphatic monocarboxylic acids include, for example, caprylic acid, nonanoic acid, lauric acid, palmitic acid, stearic acid, oleic acid, linoleic acid, and the fatty acids obtained from animal and vegetable oils. Suitable long-chain aliphatic alcohols include, for example, octyl alcohol, lauryl alcohol, hexadecanol, and octadecanol. Suitable diepoxides include, for example, those mentioned above for use in the reaction represented by Scheme A. These acids and alcohols are preferably reacted with the diepoxides at ratios of about 0.8 to 1.2 moles of carboxylic acid or alcohol to one epoxy equivalent of diepoxide under reaction conditions as described above with regard to Schemes A, B, and C.

Another class of long-chain aliphatic group-modified diols is the reaction product of an ethylenically-unsaturated acid and a modified epoxy resin obtained by reacting an hydroxyl group-containing glycidyl ether resin with either a fatty acid ester oil or a lower alkyl ester of a fatty acid, the fatty acid in both esters having 4 to 30 carbon atoms, in the presence of a basic alcoholysis catalyst. Such reaction products and their preparation are described in U.S. Pat. No. 3,876,432 (Carlick et al.) which is incorporated herein by reference for that purpose. Suitable hydroxyl group-containing glycidyl ether resins include, for example, Epon ™ resins available from Shell Chemical Co. such as Epon ™ 834, Epon ™ 836, Epon ™ 1001, Epon ™ 1002, and Epon ™ 1004.

A still further class of long-chain aliphatic group-modified diols is the reaction product of an ethylenically-unsaturated organic acid such as acrylic acid, methacrylic acid, and chloroacrylic acid, and a modified epoxy resin obtained by reacting a hydroxyl group-containing glycidyl ether resin, described above, with long-chain aliphatic isocyanates having 4 to 30 carbon atoms, such as, for example, octyl isocyanate, dodecyl isocyanate, and stearyl isocyanate, the acid reacting with the epoxy groups of the resin and the isocyanate reacting with the hydroxyl groups of the resin. Such reactions are well-known in the art.

Component (b), the cellulose ether or ester, of the polyethylenically-unsaturated, cellulosic polyurethane polymers of the invention, can be any polymer having anhydroglucose units that is modified such that it is soluble in an organic solvent, such as methyl ethyl ketone, that has a viscosity of about 0.01 to 60, preferably 0.01 to 2, as determined by ASTM Test Methods D817 and D1343, and that contains 0.01 to 30 weight percent, preferably 1 to 4 weight percent, unreacted hydroxyl units. One or more cellulose ethers or esters may be used. The cellulose ether or ester has anhydroglucose units represented by the formula:

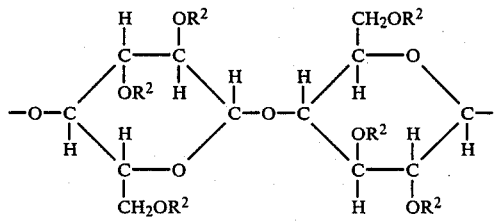

in which each $R^2$ is as defined above.

The cellulose esters are prepared by reacting a cellulose with saturated or unsaturated organic acid halides or anhydrides such as, for example, acetyl chloride, propionyl chloride, butyryl chloride, stearyl chloride, acryloyl chloride, methacryloyl chloride, or the corresponding anhydrides, with organic isocyanates including saturated isocyanates such as butyl isocyanate, stearyl isocyanate, phenyl isocyanate and unsaturated isocyanates such as 2-isocyanatoethyl methacrylate and 3-isocyanatopropyl acrylate, with the reaction product of one mole of an ethylenically-unsaturated alcohol with one mole of an organic diisocyanate, and with organic acids such as ethane sulfonic acid and with inorganic acids such as nitric acid, using procedures well-known in the art. Another class of cellulose esters may be obtained by the reaction of cellulose with ethylenically-unsaturated azlactones such as 2-ethenyl-1,3-oxazolin-5-one and 2-isopropenyl-4,4-dimethyl-1,3-oxazolin-5-one in the presence of bases such as triethylamine and dimethylaminopyridine.

The cellulose ethers are prepared by reacting a cellulose under basic conditions with haloalkanes such as methyl chloride, ethyl chloride, propyl chloride, and butyl chloride, with haloalkylarenes such as benzyl chloride, with haloalkoxyalkanes such as methoxymethyl chloride and ethoxyethyl chloride or iodide, with haloalkyl acylates such as chloromethyl acetate and chloromethyl propionate, with alkylene oxides such as ethylene oxide and propylene oxide, with N-methylolacrylamides such as N-hydroxymethylacrylamide and N-hydroxymethyl-N-isopropylmethacrylamide such as are described in U.S. Pat. No. 4,557,951 (Verbanac) which is incorporated herein by reference for that purpose.

The diisocyanate, component (c), of the polyethylenically-unsaturated cellulosic polyurethane polymers of the invention, can be any organic diisocyanate and includes those linear, branched, and cyclic aliphatic, aromatic, and heterocyclic diisocyanates which are well-known in the polyurethane field. One or more diisocyanates may be used. Preferred diisocyanates include, for example, 2,4-tolylene diisocyanate, 3,5,5-trimethyl-1-isocyanato-3-isocyanatomethylcyclohexane, bis-(4-isocyanatophenyl)methane, bis-(4-isocyanatocyclohexyl)methane, hexamethylene diisocyanate, 1,3-di(isocyanatoethyl)hydantoin, trimethylhexamethylene diisocyanate, and m- and p-tetramethylxylylene diisocyanates.

Diamines useful as an optional portion of component (a) of the present invention include aromatic primary and secondary amines, such as, for example, 2,6-diaminoanthroquinone, 2,4-diaminotoluene, 1,5-diaminonaphthalene, 2,7-diaminofluorene, 1,4-bis(N-methylamino)benzene, bis(4-aminophenyl)methane, bis(3,5-diethyl-4-aminophenyl)methane, bis(4-methylamino-3-chlorophenyl)methane and the carbonyloxy group-containing diamines disclosed in U.S. Pat. No. 3,681,290 (Meckel et al.) which is incorporated herein by reference for that purpose. Aliphatic and cycloaliphatic primary and secondary amines useful as component (a) of the present invention include 1,4-diaminobutane, 1,4-bis(methylamine)butane, bis(4-methylaminocyclohexyl)methane, bis(4-aminocyclohexyl)methane, 3,5,5-trimethyl-1-amino-3-aminomethylcyclohexane, and polymeric diamines such as the polyoxyalkylene diamines, e.g., the Jeffamines ™ available from Jefferson Chemical Co. With the inclusion of amines in the reaction mixture, the reaction product contains urea groups in addition to the urethane groups and the reaction product becomes a polyethylenically-unsaturated polyurethane/urea product which can be represented by Formulas I and II in which X is —NR— wherein R is hydrogen or lower alkyl having 1 to 6 carbon atoms.

Dithiols useful as an optional portion of component (a) of the present invention include aliphatic or cycloaliphatic dithiols which can contain an aromatic group such as 1,4-bis(2-mercaptoethoxy)benzene. Dithiols can be aliphatic dithiols having, for example 2 to 30 carbon atoms such as, for example, ethylene dithiol, 1,4-butanedithiol, bis(mercaptoethyl)ether and bis(1,4-dimercaptomethyl)cyclohexane. With the inclusion of dithiol in the reaction mixture, the reaction product contains thiocarbamato groups,

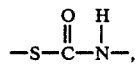

in addition to the urethane groups, and the reaction product becomes a polyethylenically-unsaturated polyurethane/thiourethane which can be represented by Formulas I and II in which X is —S—.

Polyols, polyamines, and polythiols which have more than two hydroxyl, amino, or thiol groups, respectively, may also be present in the reaction mixture from which the ethylenically-unsaturated, cellulosic polyurethanes of the invention are prepared provided that the amounts used are not sufficiently great, e.g., generally less than 5 weight percent of the reaction mixtures so as to cause gelling and/or insolubility of the product.

The thermoplastic, polyethylenically-unsaturated, cellulosic polyurethanes of the invention can be prepared by heating the reaction mixture of components (a), (b), and (c) at a temperature of about 25° to 150° C., preferably at about 50° to 100° C., for from 1 to 100 hours, generally 6 to 24 hours. The reaction is carried out at about 10 to 75 weight percent solids, preferably 40 to 60 weight percent solids, in a solvent such as butyl acetate, methyl ethyl ketone, or tetrahydrofuran. Surprisingly, the preparation of the cellulosic polyurethanes from a single reaction mixture does not result in a gelled reaction product when appropriate amounts of the reactants are used. Component (a), the ethylenically-unsaturated diol, the optional long-chain aliphatic group-modified diol, the optional diamine, and the optional dithiol preferably are from about 30 to 90 weight percent, more preferably 30 to 60 weight percent of total solids, of which 5 to 100 percent is the ethylenically-unsaturated diol. Most preferably the ethylenically-unsaturated diol component is 30 to 50 weight percent of total solids and 9 to 30 weight percent of total solids is long chain aliphatic group-modified diol. Component (b), the cellulose ether or ester, preferably is about 5 to 33 weight percent, more preferably 9 to 30 weight percent, most preferably 8 to 25 weight percent, of total solids. Component (c), the organic diisocyanates, preferably are present in an amount that provides about 0.5 to 1.2, more preferably 0.8 to 1.0, NCO equivalents per total equivalent weight of hydroxy groups, amine groups and thiol groups present in component (a). Of course, mixtures of the diols, cellulose ethers or esters, and diisocyanates can be used. In general, the reaction is carried out with an excess of hydroxyl groups in components (a) and (b) with respect to the amount of isocyanate groups present in the reaction. Use of equal stoichiometric amounts of both isocyanate and hydroxyl groups usually produces a polymer that is so highly branched that it becomes a gel even in relatively dilute solution, e.g., 10 weight percent solids or less.

The reaction is preferably run under anhydrous conditions, for example, under dry air while using mechanical agitation and in the presence of about 100 to 1000 ppm of a free radical inhibitor such as 4-methoxyphenol and, preferably, about 0.05 to 1.0 weight percent, based on total solids, of a urethane catalyst such as dibutyltin dilaurate. Preferably, the ethylenically-unsaturated diol, the optional long-chain aliphatic group-modified diols and diamines and dithiols, the cellulosic polyol, solvent, polymerization inhibitor, and catalysts are heated together to a temperature of about 60° to 100° C. with agitation until the mixture becomes homogeneous. The diisocyanate is then added and this mixture is agitated and maintained at a temperature of about 60° to 100° C. until analysis, e.g., by infrared spectroscopy, shows the desired degree of completion. If desired, the reaction can be quenched using a monoalcohol, such as butyl alcohol.

The thermoplastic, polyethylenically-unsaturated, cellulosic polyurethanes of this invention are particularly useful as coatings on substrates such as wood, plastics, metals, and ceramics. The coatings are generally applied as organic solvent solutions. Suitable solvents include, for example, acetone, methyl ethyl ketone, tetrahydrofuran, and propyl acetate. Generally, the organic solvent solutions contain about 5 to 50, preferably 10 to 30, weight percent of the cellulosic polyurethane.

Coatings prepared from the reaction product of 30 to 60 weight percent diol, 9 to 30 weight percent cellulose ether or ester, and sufficient diisocyanate to provide 0.8 to 1 mole of isocyanate groups per mole of hydroxyl groups in the diol are particularly suitable for use, for example, on furniture of wood, when the coating is required to be worked, e.g., sanded, polished, etc., while in the dried but uncured state, and which can then be cured to form a solvent and stain resistant finish.

Coatings prepared from the reaction product of 30 to 50 weight percent diol, 9 to 30 weight percent long chain aliphatic group-modified diol, 8 to 25 weight percent cellulose ether or ester, and sufficient diisocyanate to provide 0.8 to 1 mole of isocyanate groups per mole of hydroxyl groups in the diol are particularly suitable where the coating is required to be worked in the dried but uncured state, which coating can then be cured to form a solvent and stain resistant finish, and where the finish does not cause whitening on exposure to temperature cycling, i.e., cold checking, such as may occur on furniture of wood with other finishes.

The thermoplastic polyethylenically-unsaturated, cellulosic polyurethanes of the invention can also be used in binder systems, imaging systems, embossable coatings, adhesives, molding compositions, and information storage systems.

Polymerization initiators are generally required as part of the coating solution when curing, i.e., crosslinking, is to be carried out thermally or by the use of actinic radiation. Generally, curing by the use of actinic radiation is preferred where the thickness of the coating permits.

Suitable heat activated free-radical initiators include, for example, benzoyl peroxide, lauroyl peroxide, dicyclohexyl percarbonate, and azo-bis(isobutyronitrile). Generally, the heat activated initiator is present in an amount of about 0.1 to 5.0 weight percent based on the amount of the cellulosic polyurethane. When the initiator is present in an amount less than about 0.1 weight percent, the polymerization rate is extremely slow.

When the initiator is present in excess of about 5 weight percent, no corresponding improvement in polymerization is generally seen.

Suitable radiation activated initiators include, for example, acyloin and derivatives thereof such as benzoin, benzoin methyl ether, benzoin ethyl ether, benzoin isopropyl ether, benzoin isobutyl ether, and 2-hydroxy-2-methyl-1,2-diphenylethanone; diketones such as benzil and diacetyl; and phenones such as acetophenone, 2,2,2-tribromo-1-phenylethanone, 2,2-diethoxyacetophenone, 2,2-dimethoxy-2-phenylacetophenone, 2,2,2-tribromo-1-(2-nitrophenyl)-ethanone, benzophenone, 4,4'-bis(dimethylamino)benzophenone, and 1-hydroxycyclohexyl phenyl ketone. Generally, the radiation activated initiator is present in an amount of about 0.01 to 10 weight percent, preferably about 0.25 to 5 weight percent, of the total polymerization composition containing the cellulosic polyurethane. When the initiator is present in an amount less than about 0.01 weight percent, the polymerization rate is extremely slow. When the initiator is present in excess of about 10 weight percent, no corresponding improvement in polymerization is generally seen.

The cellulosic polyurethane coating solution can be formulated with polymerizable ethylenically-unsaturated modifying monomers such as acrylic acid, acrylic acid derivatives, and vinyl compounds, as well as ethylenically-unsaturated oligomers and resins to enhance the properties of the coatings, e.g., hardness, flexibility, and adhesion.

Suitable ethylenically-unsaturated monomers include, for example, methyl methacrylate, ethyl acrylate, 2-ethylhexyl acrylate, chlorohexyl acrylate, styrene, 2-chlorostyrene, 2,4-dichlorostyrene, acrylic acid, acrylamide, acrylonitrile, t-butyl acrylate, methylacrylate, butyl acrylate, 2-(N-butylcarbamyl)ethyl methacrylate, 2-(N-ethylcarbamyl)ethyl methacrylate, 1,4-butylene dimethacrylate or diacrylate, ethylene dimethacrylate, hexamethylene diacrylate or dimethacrylate, glyceryl diacrylate or dimethacrylate, glyceryl triacrylate or trimethacrylate, pentaerythritol triacrylate or trimethacrylate, pentaerythritol tetraacrylate or tetramethacrylate, diallyl phthalate, dipentaerythritol pentaacrylate, neopentylglycol diacrylate, and 1,3,5-tri(2-methacryloyloxyethyl)-s-triazine.

Suitable ethylenically-unsaturated oligomers and resins include, for example, acrylated alkyds, acrylated epoxy, acrylated polyesters, acrylated polyacrylate such as the reaction product of acrylic acid with the copolymer of methyl methacrylate and glycidyl acrylate, acrylated urethane, and acrylated cellulose oligomers and resins. Generally, up to about one part by weight of modifying monomer, oligomer, and/or resin can be used per part by weight of the ethylenically-unsaturated cellulosic urethane. Non-reactive film-forming resins such as poly(methyl methacrylate) cellulose acetate, cellulose acetate butyrate, cellulose acetate propionate, and nitrocellulose and reactive film-forming polymers such as acrylated acrylics can also be included.

The coating solutions may also be formulated with blocked diamines, for example, enamines such as XE-4131 available from Sherex Chemical Company, ketimines such as H-1 available from Shell Chemical Company, and oxazolidines such as Hardener OZ available from Mobay Corp., Coatings Div. The polyethylenically-unsaturated cellulosic polyurethane coating solution can be formulated with melamines such as Resimine 745 available from Monsanto Company and with urea-formaldehyde resins such as Beckamine 21-510-P138 available from Reichold Chemicals, Inc. along with a suitable acid catalyst such as p-toluenesulfonic acid or a latent acid catalyst. Formulation with the blocked diamines, melamines or urea-formaldehyde resins will to some degree crosslink the coating before curing of the coating by irradiation. This controlled crosslinking may in some cases provide a more easily workable coating before curing of the coating by irradiation.

The coating solutions can also include a variety of additives utilized for their known purposes such as stabilizers, inhibitors, lubricants, flexibilizers, pigments, dyes, fillers such as finely divided silica, diatomaceous earth, metal oxides, fiber glass, glass bubbles, and talc. Fillers can generally be used in proportions up to about 200 weight percent based on the weight of the ethylenically unsaturated materials present, but preferably are used in amounts up to about 50 weight percent. However, in formulations where dense materials such as heavy metals and metal oxides are used as fillers, up to about 500 weight percent or more can generally be used. When the coating is to be cured by, e.g., actinic radiation, it is desirable that the additives be transparent to the radiation.

The coating solutions containing the ethylenically-unsaturated cellulosic polyurethanes can be applied to various substrates by known procedures such as conventional spraying, electrostatic spraying, dipping, brushing, roller coating, curtain coating and the like. Substrates which can be coated include plastics, metals, ceramics, and wood.

After coating, the solvent is allowed to evaporate, with added heat and the use of a forced air stream where necessary, until the coating is dry, to form an intermediate coating. Additional intermediate coatings may be applied, if desired, to increase coating thickness. At this point, in the case of a coated finished wood article, this solid intermediate stage coated surface can be repaired, if necessary, i.e., the coating may be removed with solvent and the article recoated, or it can be sanded, buffed, and polished to achieve the desired surface appearance.

When the desired surface appearance has been achieved, the coating is cured such as by infrared radiation, e.g., thermal energy, by actinic radiation at wavelengths within the ultraviolet and visible spectral regions, or by ionizing radiation, e.g., electron beam radiation.

When thermal energy is used for curing, the coated article is heated, preferably at a temperature of about 50° to 150° C., for a period of time sufficient to achieve the desired degree of crosslinking of the coating. Generally, adequate crosslinking can be achieved in from about 1 to 10 minutes or more depending on coating thickness, amount of polymerizable materials, the polymerization initiator being used, and the temperature. When temperatures above about 150° C. are used for a sufficient period of time, e.g., 1 minute to several hours, crosslinking may occur without added polymerization initiators.

Suitable sources of actinic radiation include, for example, mercury, xenon, carbon arc, tungsten filament lamps, and sunlight. Exposures may be from less than about one second to ten minutes or more depending on the amount of polymerizable materials, the polymerization initiator being used, the radiation source, the distance of the coating from the source, and the coating thickness.

When curing is effected by electron beam radiation no polymerization initiator is required. Generally, the dosage necessary is from less than 1 megarad to about 30 megarads or more. An advantage of curing with electron beam radiation is that highly pigmented coatings can be more effectively cured at a faster rate than when actinic radiation is used for curing.

Shaped articles can also be formed from compositions containing the ethylenically-unsaturated cellulosic polyurethanes of this invention because of their thermoplastic nature. Generally, when the ethylenically-unsaturated cellulosic polyurethanes are to be used for forming shaped articles, the solvent in which the polyurethane is prepared is removed, for example, by drying or by precipitation in a non-solvent for the polyurethane, e.g., hexane, naphtha, or cyclohexane followed by drying. Shaped articles which can be prepared from the ethylenically-unsaturated cellulosic polyurethanes include, for example, gears, connectors, containers, and the like.

Articles can be formed by, for example, compression molding, extrusion molding, and injection molding. The composition may also contain polymerizable ethylenically-unsaturated modifying monomers, ethylenically-unsaturated oligomers and resins, and conventional additives as described with regard to the coatings of this invention. The composition preferably also contains free-radical polymerization initiators, as described hereinabove with regard to coatings, which effect curing of the ethylenically-unsaturated polyurethane upon application of thermal energy or actinic radiation. Generally, thermally activatable initiators are used in an amount of about 0.1 to 5 weight percent based on the weight of ethylenically-unsaturated material present and actinic radiation activatable initiators are used in an amount of about 0.01 to 3 weight percent based on the weight of ethylenically-unsaturated material present.

After the shaped article has been formed, the article can be worked by, e.g., sanding, polishing, machining, etc. When the article is in the final form desired, it can be cured by application of heat or actinic radiation such that it becomes insoluble and infusible. Generally, when the shaped article has a thickness greater than about 5 millimeters, curing is preferably carried out thermally at temperatures of about 50° to 200° C. or more for a time sufficient to cure the article. The length of time for cure is dependent on the thickness of the article, the amounts of polymerizable materials and initiator, and the curing temperature. The shaped article can also be cured by ionizing radiation such as electron beam radiation. When curing is effected by electron beam radiation, the composition need not contain a polymerization initiator. Also, when temperatures above about 200° C. are used for a sufficient period of time, e.g., 1 minute to several hours, crosslinking may occur without added polymerization initiators.

The following nonlimiting examples are provided to further illustrate the invention. In each of Examples 1–17, the reaction product contained the units

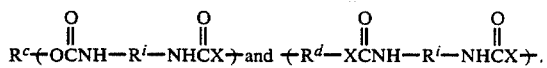

In these examples, all parts and percentages are by weight unless otherwise specified.

Preparation of Polyethylenically-Unsaturated Organic Diol I (PUD-I)

Into a 22 L flask equipped with an overhead stirrer, reflux condenser, heating mantle, and dry air purge were charged 10.6 Kg (60 epoxy equivalents) DER ™ 332 (diglycidyl ether of bisphenol A available from Dow Chemical Co.), 2.65 g 4-methoxyhydroquinone, 13.6 g AMC-2 ™ (chromium acid salt blend available from Cordova Chemical Co.), and 1.65 Kg (22.9 equivalents) acrylic acid. The reaction mixture was heated with stirring for 35 minutes. A dry air purge was initiated with continued heating and stirring and, after 50 minutes, the reaction mixture was at a temperature of 45° C. and had become a clear, homogeneous solution. Heating and stirring were continued with the temperature rising to 140° C. over a period of 3.5 hours and the temperature allowed to drop to 100° C. and was held at 100° C. for the remainder of the reaction time. After 3, 4, and 4.25 hours reaction time, there were added 0.89 Kg (12.35 equivalents), 0.85 Kg (11.80 equivalents), and 0.94 Kg (13.05 equivalents), respectively, acrylic acid (60 acid equivalents total). After 5.25 hours reaction time, an additional 0.056 Kg acrylic acid (1.3% equivalent excess) was added. After 6 hours reaction time, an additional 26.4 g AMC-2 ™ was added. After a total reaction time of 23.3 hours, analysis by titration indicated 0.29% residual carboxylic acid groups and 0.1% residual epoxy groups. After 25.4 hours, the reaction mixture was allowed to cool. Infrared spectroscopy (IR), $^1$H-nuclear magnetic resonance ($^1$H-NMR), reverse phase chromatography (RPC), and gel permeation chromatography (GPC) indicated the reaction mixture to have a structure consistent with that expected for the adduct of acrylic acid and the diglycidyl ether of bisphenol A:

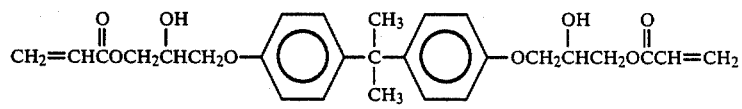

Preparation of a Long Chain Aliphatic Group-modified Polyethylenically-Unsaturated Organic Diol II (PUD-II)

Into a 5 L, 3-neck round bottom flask equipped with an overhead stirrer and dry air purge were charged 1148 g (6.52 epoxy equivalents) DER ™ 332, 235 g (3.26 equivalents) acrylic acid, 872 g (3.26 equivalents) stearic acid (acid equivalent weight 267), and 6.5 g AMC-2 ™. The flask was fitted with a reflux condenser and the reaction mixture was heated to 80° C. under a dry air atmosphere with stirring and then held at 80° C. for 4 hours. The temperature was then raised to 90° C. and held for 15 hours. Analysis of the reaction product indicated 0.56% residual carboxyl groups and 5.8% residual epoxy groups. An additional 25 g (0.35 equivalents) acrylic acid were added, and the reaction maintained at 90° C. for 6 hours. Analysis indicated 4.9% residual carboxyl groups and 5.4% residual epoxy groups. An additional 10 grams (0.14 equivalents) acrylic acid were added and the reaction mixture was maintained at 90° C. for an additional 15 hours. Analysis indicated 1.6% residual carboxyl groups and 1.6% residual epoxy groups. An additional 1.35 g AMC-2 TM were added and the reaction mixture was maintained at 90° C. for an additional 15 hours. Analysis indicated 2.5% residual carboxyl groups and 0.2% residual epoxy groups. The reaction mixture was allowed to cool and a waxy whitish-green solid was obtained. IR, $^1$H-NMR, RPC, and GPC confirmed that the reaction product was the expected 2:1:1 mixture of adducts of acrylic acid, stearic acid, and the diglycidyl ether of bisphenol A, respectively, the reaction mixture. Finally, n-butanol (3 mL) was added to quench the reaction.

Analysis of the reaction mixture by IR and $^1$H-NMR was consistent with the expected ethylenically-unsaturated, cellulosic polyurethane polymer.

A sample of the reaction mixture was analyzed by GPC using tetrahydrofuran as eluent to determine the weight average molecular weight (Mw) and the number average molecular weight (Mn), and the polydispersity index (Pi) where Pi=Mw/Mn was calculated. About 2 to 4 grams of the reaction mixture was coated onto unprimed polyester film (0.1 mm thick, 10 cm wide, 30 cm long) at a wet thickness of about 0.16 mm. The coating was dried at about 22° C. for about 15 hours and then further dried in a forced air oven at 50° C. for 1

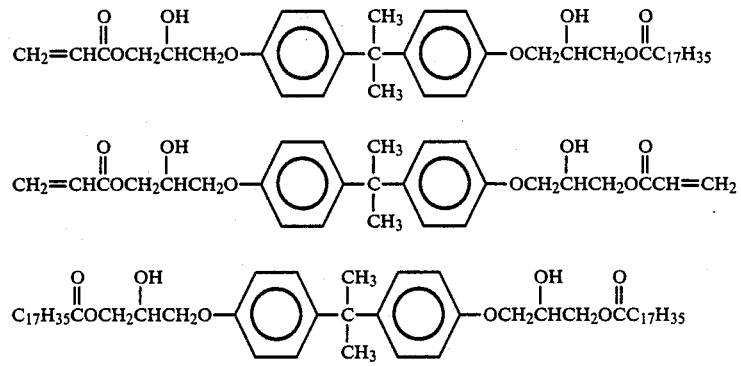

Preparation of Organic Diol (OD-I)

Following the procedure described for the preparation of PUD-I, 346.6 g (2.0 equivalents) DER TM 332 and 148.0 g (2.0 acid equivalents) propionic acid were reacted in the presence of 2 g AMC-2 TM at 80° C. for 19 hours and at 90° C. for 7 hours to yield a diol with less than 1 weight percent each of residual acid and epoxy groups. IR, $^1$H-NMR, RPC, and GPC were consistent with the expected reaction product hour to provide a dried coating about 0.06 mm thick. The resulting film was analyzed by differential scanning colorimetry (DSC) to determine the glass transition temperature (Tg) of the polymer. The results are set forth in Table I.

EXAMPLE 2

A polyethylenically-unsaturated, cellulosic polyurethane polymer was prepared using the general procedure of Example 1 using 92.1 g (0.375 hydroxyl equiva-

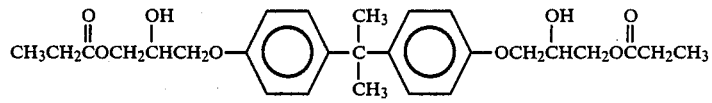

EXAMPLE 1

Into a 3-neck 500 mL round bottom flask equipped with an overhead stirrer and reflux condenser were charged 54 g (0.22 hydroxyl equivalents) PUD-I, 34.6 g (0.10 hydroxyl equivalents) PUD-II, 36.7 g CAB TM 381-0.1 (cellulose acetate butyrate containing 38% butyrate, 13% acetate, and 1% hydroxyl groups and having a viscosity of 0.1 as determined by ASTM D-817, formula A, available from Eastman Chemical Co.), and 195 g butyl acetate. The mixture was stirred and heated under dry air to 110° C. The resulting homogeneous mixture was then cooled and about 1000 ppm dibutyltin dilaurate and 33.6 g (0.30 isocyanate equivalents) isophorone diisocyanate (theoretical isocyanate equivalent weight 111, available from Huls, A. G.) were added to the mixture. This reaction mixture was stirred at 85° C. for about 20 hours. An infrared spectrum of the resulting product showed an absence of peaks at 2265 cm$^{-1}$ indicating the disappearance of isocyanate groups from lents) PUD-I, 43.2 g (0.125 hydroxyl equivalents) PUD-II, and substituting 18.5 g CAP TM 504-0.2 (cellulose acetate propionate containing 42% propionate, 2.5% acetyl, 4.7% hydroxyl groups and having a hydroxy equivalent weight of 362, available from Eastman Chemical Products Co. with 50% of the hydroxyl groups prereacted with 2.6 g (0.026 equivalents) butyl isocyanate for the CAB TM 381-0.1, dissolved in 207 g butyl acetate and reacted with 50 g (0.45 isocyanate equivalent) isophorone diisocyanate in the presence of 1000 ppm dibutyltin dilaurate. When infrared analysis indicated the absence of isocyanate groups the reaction was quenched using about 1% n-butanol. The glass transition temperature, weight average molecular weight, number average molecular weight, and polydispersity index of the product were determined using DSC and GPC. The results are set forth in Table I.

EXAMPLE 3

A polyethylenically-unsaturated, cellulosic polyurethane polymer was prepared using the general procedure of Example 1 using 58.9 g (0.24 hydroxyl equivalents) PUD-I, 27.7 g (0.08 hydroxyl equivalents) PUD-II, and substituting 23.72 g CAB TM 551-0.01 (cellulose acetate butyrate containing 51% butyrate, 2% acetyl, and 1% hydroxyl groups, available from Eastman Chemical Products Co.) for the CAB TM 381-0.1 dissolved in 174 g butyl acetate and reacted with 32 g (0.29 isocyanate equivalents) isophorone diisocyanate in the presence of 1000 ppm dibutyltin dilaurate. When infrared analysis indicated the absence of isocyanate groups the reaction was quenched using about 1% n-butanol. The glass transition temperature, weight average molecular weight, number average molecular weight, and polydispersity index of the product were determined using DSC and GPC. The results are set forth in Table I.

EXAMPLE 4

A polyethylenically-unsaturated, cellulosic polyurethane polymer was prepared using the general procedure of Example 1 using 58.9 g (0.24 hydroxyl equivalents) PUD-I, 27.7 g (0.08 hydroxyl equivalents) PUD-II, and 23.72 g CAB TM 381-0.1 dissolved in 174 g butyl acetate and reacted with 32 g (0.29 isocyanate equivalents) isophorone diisocyanate in the presence of 1000 ppm dibutyltin dilaurate. When infrared analysis indicated the absence of isocyanate groups, the reaction was quenched using about 1% n-butanol. The glass transition temperature, weight average molecular weight, number average molecular weight, and polydispersity index of the product were determined using DSC and GPC. The results are set forth in Table I.

EXAMPLE 5

A polyethylenically-unsaturated, cellulosic polyurethane polymer was prepared using the general procedure of Example 1 substituting 29.3 g (0.24 hydroxyl equivalents) pentaerythritol diacrylate for the PUD-I and using 27.7 g (0.08 hydroxyl equivalents) PUD-II, and 27.6 g CAB TM 381-0.1 dissolved in 148.4 g butyl acetate and reacted with 35.2 g (0.32 isocyanate equivalents) isophorone diisocyanate in the presence of 1000 ppm dibutyltin dilaurate. When infrared analysis indicated the absence of isocyanate groups, the reaction was quenched using about 1% n-butanol. The glass transition temperature, weight average molecular weight, number average molecular weight, and polydispersity index of the product were determined using DSC and GPC. The results are set forth in Table I.

EXAMPLE 6

A polyethylenically-unsaturated, cellulosic polyurethane polymer was prepared using the general procedure of Example 1 using 36.8 g (0.15 hydroxyl equivalents) PUD-I, 17.3 g (0.05 hydroxyl equivalents) PUD-II, and substituting 7.5 g Ethocell TM 45 (an ethyl ether substituted cellulosic with an ethoxyl content of 45%, available from Dow Chemical Co.) for the CAB TM 381-0.1 dissolved in 101 g butyl acetate and reacted with 21 g (0.19 isocyanate equivalents) isophorone diisocyanate in the presence of 1000 ppm dibutyltin dilaurate. When infrared analysis indicated the absence of isocyanate groups, the reaction was quenched with about 1% n-butanol.

EXAMPLE 7

A polyethylenically-unsaturated, cellulosic polyurethane polymer was prepared using the general procedure of Example 1 using 86.5 g (0.35 hydroxyl equivalents) PUD-I, omitting PUD-II, and using 30.9 g CAB TM 381-0.1 dissolved in 154.3 g butyl acetate and reacted with 36.0 g (0.32 isocyanate equivalents) isophorone diisocyanate in the presence of 1000 ppm dibutyltin dilaurate. When infrared analysis indicated the absence of isocyanate groups, the reaction was quenched using about 1% n-butanol.

EXAMPLE 8

A polyethylenically-unsaturated, cellulosic polyurethane polymer was prepared using the general procedure of Example 1 using 75.6 g (0.318 hydroxyl equivalents) PUD-I, 15.28 g (0.044 hydroxyl equivalents) PUD-II, and 31.9 g CAB TM 381-0.1 dissolved in 159.7 g butyl acetate and reacted with 37.0 g (0.33 isocyanate equivalents) isophorone diisocyanate in the presence of 1000 ppm dibutyltin dilaurate. When infrared analysis indicated the absence of isocyanate groups the reaction was quenched with about 1% n-butanol. The glass transition temperature, weight average molecular weight, number average molecular weight, and polydispersity index of the product were determined using GPC and DSC. The results are set forth in Table I.

EXAMPLE 9

A polyethylenically-unsaturated, cellulosic polyurethane polymer was prepared using the general procedure of Example 1 substituting 29.3 g (0.24 hydroxyl equivalents) pentaerythritol diacrylate for PUD I and using 27.7 g (0.08 hydroxyl equivalents) PUD-II and 46.1 g CAB TM 551-0.01 dissolved in 168.9 g butyl acetate and reacted with 25.2 g (0.32 isocyanate equivalents, isocyanate equivalent weight: 110) isophorone diisocyanate in the presence of 1000 ppm dibutyltin dilaurate. When infrared analysis indicated the absence of isocyanate groups, the reaction was quenched using about 1% n-butanol. The glass transition temperature, weight average molecular weight, number average molecular weight, and polydispersity index of the product were determined using GPC and DSC. The results are set forth in Table I.

EXAMPLE 10

A polyethylenically-unsaturated, cellulosic polyurethane polymer was prepared using the general procedure of Example 1 using 36.8 g (0.15 hydroxyl equivalents) PUD-I, substituting 37.1 g (0.15 hydroxyl equivalents) OD-I for PUD-II, and using 21.1 g CAB TM 381-0.1 dissolved in 126.5 g butyl acetate and reacted with 31.5 g (0.28 isocyanate equivalents) isophorone diisocyanate in the presence of 1000 ppm dibutyltin dilaurate. When infrared analysis indicated the absence of isocyanate groups, the reaction was quenched using about 1% n-butanol. The glass transition temperature, weight average molecular weight, number average molecular weight, and polydispersity index of the product were determined using GPC and DSC. The results are set forth in Table I.

EXAMPLE 11

A polyethylenically-unsaturated, cellulosic polyurethane polymer was prepared using the general procedure of Example 1 using 18.4 g (0.075 hydroxyl equivalents) PUD-I, substituting 55.7 g (0.225 hydroxyl equivalents) OD-I for PUD-II, and using 21.2 g CAB TM 381-0.1 dissolved in 126.7 g butyl acetate and reacted with 31.5 g (0.28 isocyanate equivalents) isophorone diisocyanate in the presence of 1000 ppm dibutyltin dilaurate. When infrared analysis indicated the absence of isocyanate groups, the reaction was quenched using about 1% n-butanol. The glass transition temperature, weight average molecular weight, number average molecular weight, and polydispersity index of the product were determined using GPC and DSC. The results are set forth in Table I.

EXAMPLE 12

A polyethylenically-unsaturated, cellulosic polyurethane polymer was prepared using the general procedure of Example 1 using 36.8 g (0.15 hydroxyl equivalents) PUD-I, 51.8 g (0.15 hydroxyl equivalents) PUD-II, and 24.0 g CAB TM 381-0.1 dissolved in 144.2 g butyl acetate and reacted with 31.5 g (0.28 isocyanate equivalents) isophorone diisocyanate in the presence of 1000 ppm dibutyltin dilaurate. When infrared analysis indicated the absence of isocyanate groups, the reaction was quenched using about 1% n-butanol. The glass transition temperature, weight average molecular weight, number average molecular weight, and polydispersity index of the product were determined using GPC and DSC. The results are set forth in Table I.

EXAMPLE 13

A polyethylenically-unsaturated, cellulosic polyurethane polymer was prepared using the general procedure of Example 1 using 24.6 g (0.10 hydroxyl equivalents) PUD-I, substituting 15.8 g (0.10 hydroxyl equivalents) bis(hydroxyethyl ether) of Bisphenol A for PUD-II, and 12.3 g CAB TM 381-0.1 dissolved in 74.0 g butyl acetate and reacted with 21 g (0.19 isocyanate equivalents) isophorone diisocyanate in the presence of 1000 ppm dibutyltin dilaurate. When infrared analysis indicated the absence of isocyanate groups, the reaction was quenched using about 1% n-butanol. The glass transition temperature, weight average molecular weight, number average molecular weight, and polydispersity index of the product were determined using GPC and DSC. The results are set forth in Table I.

EXAMPLE 14

A polyethylenically-unsaturated, cellulosic polyurethane polymer was prepared using the general procedure of Example 1 using 58.9 g (0.24 hydroxyl equivalents) PUD-I, 27.6 g (0.08 hydroxyl equivalents) PUD-II, and 24 g CAB TM 381-0.1, adding 14.9 g UGRS TM nitrocellulose (90% solids, toluene wet, available from Hercules Chemical Co.) dissolved in 156 g butyl acetate and reacted with 33.6 g (0.30 isocyanate equivalents) isophorone diisocyanate in the presence of 1000 ppm dibutyltin dilaurate. When infrared analysis indicated the absence of isocyanate groups, the reaction was quenched using about 1% n-butanol. The glass transition temperature, weight average molecular weight, number average molecular weight, and polydispersity index of the product were determined using GPC and DSC. The results are set forth in Table I.

EXAMPLE 15

A polyethylenically-unsaturated, cellulosic polyurethane polymer was prepared using the general procedure of Example 1 using 294.7 g (1.2 hydroxyl equivalents) PUD-I, 140.0 g (0.4 hydroxyl equivalents) PUD-II, and 120.5 g CAB TM 381-0.1 dissolved in 732.2 g butyl acetate and reacted with 168 g (1.5 isocyanate equivalents) isophorone diisocyanate in the presence of 1000 ppm dibutyltin dilaurate. When infrared analysis indicated the absence of isocyanate groups, the reaction was quenched using about 1 percent n-butanol. Into 9 parts of the resulting reaction product was dissolved 1 part solids SS TM 0.5 sec. nitrocellulose (available from Hercules, Inc. at 70% solids in propanol).

EXAMPLE 16

A polyethylenically-unsaturated, cellulosic polyurethane polymer was prepared using the procedure of Example 1 using 1.94 g (0.028 thiol equivalents) di(2-mercaptoethyl)-ether which was prereacted for 3 hours at 85° with 14.25 g (0.128 isocyanate equivalents) isophorone diisocyanate in 11.0 g of butyl acetate in the presence of 5 drops triethylamine, this reaction mixture being added to a homogeneous solution of 29.93 g (0.122 hydroxyl equivalents) PUD-I, 9.22 g CAB TM 381-0.1 and 1000 ppm dibutyltin dilaurate in 55.3 g butyl acetate. When infrared analysis indicated the absence of isocyanate groups, the reaction was quenched with about 1% n-butanol. The glass transition temperature, weight average molecular weight, number average molecular weight, and polydispersity index of the product were determined using DSC and GPC. The results are set forth in Table I.

EXAMPLE 17

A polyethylenically-unsaturated, cellulosic polyurethane polymer was prepared using the general Procedure of Example 1 using 2.21 g (0.028 amine equivalents) trimethylene glycol di-p-amino-benzoate, 29.93 g (0.12 hydroxyl equivalents) PUD-I and 9.3 g CAB TM 381-0.1 dissolved in 55.7 g butyl acetate and reacted with 14.25 g (0.128 isocyanate equivalents) isophorone diisocyanate in the presence of 1000 ppm dibutyltin dilaurate. When infrared analysis indicated the absence of isocyanate groups, the reaction was quenched using about 1% n-butanol. The glass transition temperature, weight average molecular weight, number average molecular weight, and polydispersity index of the product were determined using DSC and GPC. The results are set forth in Table I.

COMPARATIVE EXAMPLE C1

A non-cellulosic polyethylenically-unsaturated, polyurethane polymer was prepared by charging a 500 mL round bottom flask, equipped with an overhead stirrer and a reflux condenser under a dry air atmosphere, with 86.5 g (0.35 hydroxyl equivalents) PUD-I, 123.4 g butyl acetate, 1000 ppm dibutyltin dilaurate, and 37.0 g (0.33 isocyanate equivalents) isophorone diisocyanate. The mixture was heated to 85° C. and allowed to react for 15.5 hours. Infrared analysis showed the absence of isocyanate groups and the reaction was quenched with 5 mL n-butanol. The glass transition temperature was determined using DSC. The results are set forth in Table I.

COMPARATIVE EXAMPLE C2

A non-cellulosic polyethylenically-unsaturated, polyurethane polymer was prepared as in Comparative Example 1 using 244.6 g (1.0 hydroxyl equivalents) PUD-I, 140 g (0.14 hydroxyl equivalent) PPG TM 2025 (poly(oxypropylene) diol molecular weight about 2000, available from Union Carbide), 522 g butyl acetate and about 1000 ppm dibutyltin dilaurate and substituting 137.1 g (1.05 isocyanate equivalents, theoretical isocyanate equivalent weight 131) Desmodur TM W (bis(4-isocyanatophenyl) methane, available from Mobay Chemical Co.) for the isophorone diisocyanate. When infrared analysis indicated the absence of isocyanate groups, the reaction was quenched using about 1 weight percent n-butanol. The glass transition temperature, weight average molecular weight, number average molecular weight, and polydispersity index of the product were determined using GPC and DSC. The results are set forth in Table I.

TABLE I

| Example | Mw | Mn | Pi | Tg (°C.) |
|---|---|---|---|---|
| 1 | 43,900 | 1,400 | 31.4 | 43–60 |
| 2 | 53,100 | 2,400 | 22.2 | 27–51 |
| 3 | 24,100 | 2,900 | 8.3 | 37–54 |
| 4 | 22,200 | 2,100 | 7.9 | 42–56 |
| 5 | 21,900 | 2,780 | 7.9 | 39–58 |
| 8 | 88,900 | 6,090 | 14.6 | 34–60 |
| 9 | 17,400 | 2,430 | 7.2 | 32–60 |
| 10 | 48,700 | 5,430 | 9.0 | 32–58 |
| 11 | 41,900 | 5,100 | 8.2 | 34–56 |
| 12 | 59,600 | 6,130 | 9.9 | 34–53 |
| 13 | 44,200 | 6,450 | 6.9 | 39–52 |
| 14 | 22,800 | 3,680 | 6.2 | 30–66 |
| 16 | 26,500 | 4,710 | 5.6 | 20–49 |
| 17 | 120,000 | 7,410 | 16.2 | 20–56 |
| C1 | — | — | — | 34–48 |
| C2 | 36,500 | 14,400 | 2.5 | −14–42 |

In the following performance evaluations, selected of the ethylenically-unsaturated, cellulosic polyurethane polymers and the non-cellulosic ethylenically-unsaturated polyurethane polymers of Comparative Examples C1 and C2 were evaluated. In these performance evaluations, each coating is identified by the example number or comparative example number corresponding to the preparation of the cellulosic polyurethane (examples of the invention) or the non-cellulosic polyurethane (comparative examples). The performance of a nitrocellulose lacquer available from Reliance Universal, Inc. under the trade designation 20 sheen lacquer, part no. 4120L5-1245A, was also evaluated and is identified as coating composition C3.

Coating solutions were prepared by diluting each polyurethane reaction product of Examples 1–5, 7–9, and 14–15 and Comparative Examples C1–C3 such that a coating solution resulted containing 20% solids, 40% butyl acetate, 20% propyl acetate, and 20% n-propanol. About 4 weight percent photoinitiator (Irgacure TM 184 available from Ciba-Geigy Corp.), based on the weight of the solids, was added to each coating solution.

Wood substrates were prepared by sanding 30 cm×30 cm oak panels with 320 grit sandpaper, spraying the sanded wood with a 10% 1:1 n-butyl acetate:n-butanol solution of an acid-catalyzed urea-formaldehyde wash coat, allowing the coating to dry, rubbing the dried wash coat with a linseed oil filler, applying an 18% solids 2:1:1 n-butyl acetate:n-propyl acetate:n-propanol solution of an acid-catalyzed urea-formaldehyde sealer coat, drying the sealer coat, and sanding with 320 grit zinc stearate-treated sandpaper.

The coating solutions were spray coated onto the prepared wood substrates in three applications, allowing 20 minutes for air drying between each coat to provide coating thicknesses of 75 to 100 microns. After the final coat, the coated substrates were air dried for 30 minutes and then oven dried at 50° C. for 30 minutes.

The dried coatings were visually evaluated for dry-down character, e.g., coating evenness, presence of bubbles, etc.

After further air drying at about 25° C. for about 20 hours, the coated substrates were sanded with 400 grit sandpaper, sanded with 600 grit sandpaper, rubbed with T-type Scotchbrite TM cleaning and polishing pad, available from 3M Company, and then polished with Prep Team TM, a super heavy duty rubbing compound available from 3M Company.

The coatings were qualitatively rated for sandability and polishability. Coatings having excellent sandability do not load or gum the sandpaper, while coatings having poor sandability rapidly load or gum the sandpaper. Coating having excellent polishability are mirror-flat by visual inspection and provide sharp reflected images after polishing, while coatings having poor polishability give poorly defined reflected images by visual inspection after polishing.

The coatings of the invention as well as the nitrocellulose lacquer of Comparative Example C3, all of which contain a cellulosic component, provided good dry-down character, good sandability, and good polishability. The coating of Comparative Example C1 had bubbles after dry-down and both the coatings of Comparative Examples C1 and C2, which do not contain a cellulosic component, were sufficiently soft that they loaded the sandpaper during sanding and gave poorly defined reflected images after polishing.

The thus-prepared coatings were cured by exposure to ultraviolet light at a total dose of about 2 joules/cm$^2$ by passing the prepared coated panel through a U.V. Processor, Model QC-1202 N/A, available from Radiation Polymer Co., at a belt speed of 32 cm/min under two 300 watt/cm medium pressure mercury lamps set at a distance of about 8 cm above the surface of the coating.

Solvent and stain resistance of the coatings were evaluated on horizontal cured panels. The solvents and staining materials tested included acetone (S1), finger nail polish remover (S2), 50/50 ethanol/water (S3), 70/30 isopropanol/water (S4), Kiwi TM brown shoe polish (S5), Merthiolate TM (S6), 10% aqueous trisodium phosphate (S7), and 5% aqueous ammonia (S8).

Cotton balls, two for each reagent, were placed at random locations on each test panel. The cotton balls were then thoroughly saturated with reagent and covered with a jar lid. At half-hour intervals, the jar lids were removed from the acetone and finger nail polish remover test sites and the coating performance was evaluated. The remaining solvents and staining agents were left undisturbed for 8 hours. At the end of that time all the covers and cotton balls were removed and all test sites wiped with a damp cloth followed by wiping with a clean dry cloth. The treated test panels were then conditioned for 16 to 24 hours at about 25° C. and rated on a scale of 1 to 5 as follows:

5: no visible change (no damage);
4: slight change in luster, visible only when the light source is mirrored in the test surface on or near the mark and is reflected towards the observer's eye, or a few isolated marks just visible
3: slight mark, visible in several viewing directions, e.g., almost entire exposed area just visible, or few isolated blisters in the wood grain only;

2: strong mark with the structure of the surface being largely unchanged, or blistering or delamination in the wood grain; and 1: strong mark with the structure of the surface being changed, or the surface material being at least partially removed or delaminated, or the cotton ball adhering to the surface.

Note: If the two initial rating values for a given solvent were within at least 1 rating point of each other, the ratings are averaged and the average reported. If the difference between the two initial rating values was greater than 1, three additional test sites were tested with the high and low rating values of the five tests deleted and the remaining three rating values averaged.

Preferably the solvent and stain resistance values are at least 2, more preferably at least 4. The solvent and stain resistance results are set forth in Table II.

Table II

| Coating | Solvent or staining material | | | | | | | |
|---|---|---|---|---|---|---|---|---|
| | S1 | S2 | S3 | S4 | S5 | S6 | S7 | S8 |
| 1 | 5 | 5 | 5 | 5 | 5 | 5 | 5 | 4 |
| 2 | 5 | 5 | 5 | 5 | 5 | 5 | 5 | 4 |
| 3 | 5 | 5 | 5 | 5 | 5 | 5 | 5 | 4 |
| 4 | 5 | 5 | 5 | 5 | 5 | 5 | 5 | 4 |
| 5 | 5 | 5 | 5 | 5 | 4 | 3 | 5 | 3 |
| 7 | 5 | 5 | 5 | 5 | 4 | 5 | — | 3 |
| 8 | 5 | 5 | 5 | 5 | 4 | 5 | — | 3 |
| 9 | 1 | 1 | 5 | 5 | 4 | 4 | 5 | 3 |
| 14 | 4 | 5 | 5 | 5 | 5 | 4 | 5 | 4 |
| 15 | 5 | 5 | 5 | 5 | 5 | 4 | 5 | 4 |
| C1 | 5 | 5 | 5 | 5 | 5 | 5 | 5 | 4 |
| C2 | 1 | 1 | 5 | 5 | 2 | 3 | 5 | — |
| C3 | 1 | 1 | 1 | 4 | 1 | 1 | 4 | 3 |

As can be seen from the data in Table II, coatings of Examples 1–5, 7–8, and 14–15, as well as the coatings of Comparative Examples C1 and C2, all of which had a high degree of ethylenic unsaturation and thus were crosslinkable, exhibited good resistance to solvents and staining materials. The coating of Example 9, which included the greatest proportion, 33%, of cellulosic polyol in the reaction product showed poor resistance to strong organic solvents, i.e., acetone and finger nail polish remover, but good resistance to the other solvents and staining materials tested. The nitrocellulose lacquer coating which is uncrosslinked showed the overall poorest resistance to all solvents and staining materials.

The panels having the cured coatings thereon were also evaluated for dry hot print resistance (DHP) and wet hot print resistance (WHP). Dry hot print resistance was determined by placing a double layer of cheese cloth on the test panel and placing a 5-pound weight, heated to 100° C., on the cheese cloth. After 30 minutes, the weight is removed, the surface wiped with a soft cloth, and the panel is conditioned for 16 to 20 hours at about 25° C. and rated. Wet hot print resistance was determined by the same procedure as is used for dry hot print resistance except the cheese cloth is saturated with distilled water prior to placing the weight on it. The panels are evaluated using the same ratings as for solvent and stain resistance. Preferably the dry hot print resistance and the wet hot print resistance are at least 2, more preferably at least 4. The results are set forth in Table III.

The panels having the cured coatings thereon were further evaluated for cold check resistance (CCR), i.e., whiting. Cold check resistance was determined by cycling the panels through (1) one hour at 50° C. in a forced air oven, (2) one hour at −23° C. in a freezer, and (3) 30 minutes at 25° C. and examined for whiting after each cycle with a maximum of 20 cycles being run on each panel. Preferably, the panels survive at least 10 cycles without whiting, more preferably at least 20 cycles without whiting. The number of cycles required to produce whiting is reported in Table III.

Abrasion resistance (AR) of the coatings produced by each coating solution was determined by spreading about 6 g of the prepared coating solution onto a 10 cm×60 cm sheet of photograde polyester film using a #55 wire wound rod. The coatings were dried overnight at about 25° C. in a dust free environment and cured under ultraviolet light at a total dose of about 2 joules/cm$^2$ by passing the prepared coated sheet through a U.V. Processor, Model QC-1202 N/A, available from Radiation Polymer Co., at a belt speed of 32 cm/min under two 300 watt/cm medium pressure mercury lamps set at a distance of about 8 cm above the surface of the coating. Discs having a diameter of 10 cm were cut from the sheets of film and abraded on a Taber TM Abraser, available from Gardner/Neotec Division of Pacific Scientific, using a CS 17 abrasive wheel with a 500 g load for 30 cycles. The abrasion resistance is determined by measuring the haze value of the abraded film with a Gardner TM Hazemeter Model No. XL-211, available from Gardner/Neotec Co. The lower the haze value, the greater is the abrasion resistance of the coating. Preferably, the haze value is 25 or lower, more preferably, 20 or lower. The abrasion resistance is reported in Table III.

Dried cured coatings, prepared as described above, using the polyethylenically-unsaturated cellulosic polyurethanes of Examples 6, 10, 11, 12, 13, 16 and 17 showed solvent resistance to 200 rubs with a methyl ethyl ketone saturated cotton swab.

TABLE III

| Coating | DHP | WHP | CCR | AR |
|---|---|---|---|---|
| 1 | 5 | 4 | 20+ | 16.5 |
| 2 | 5 | 4 | 20+ | 17.1 |
| 3 | 5 | 4 | 20+ | 16.7 |
| 4 | 5 | 4 | 20+ | 15.0 |
| 5 | 4 | 4 | 20+ | 20.0 |
| 7 | 5 | 4 | 2 | 16.0 |
| 8 | 5 | 4 | 4 | 18.1 |
| 9 | 3 | 4 | 20+ | 24.5 |
| 14 | 5 | 4 | 20+ | 20.1 |
| 15 | 5 | 4 | 20+ | 18.3 |
| C1 | 5 | 5 | 2 | 14.3 |
| C2 | 5 | 3 | 6 | 6.8 |
| C3 | 1 | 1 | 20+ | 50.0 |

As can be seen from the data in Table III, the coatings of the invention and the coatings of Comparative Examples C1 and C2, all of which contain ethylenic unsaturation and are crosslinkable, exhibit good resistance to dry hot print, wet hot print, and abrasion. The nitrocellulose lacquer coating which does not crosslink exhibited poor resistance to dry hot print, wet hot print, and abrasion. The coatings of Examples 1–5, 9, and 14–15 which have relatively high amounts of long chain aliphatic group-modified diols in the reaction product exhibited excellent resistance to cold checking. The coatings of Example 7 and Comparative Examples C1 and C2 which do not contain long chain aliphatic group-modified diols and the coating of Example 8 which contains a relatively small amount of long chain aliphatic group-modified diol in the reaction product, exhibited poor cold check resistance.

EXAMPLE 18

The reaction product of Example 11 was coated onto polyester film at about 0.2 mm wet thickness and allowed to dry at ambient (22° C.) overnight. The dried polymer was scraped from the film and ground to a powder. A disk was prepared from this powder by pouring the powder into a 20 mm diameter annular Teflon ™ die standing on end on a Teflon ™ platen to a powder depth of about 8 mm, compressing the powder by placing a U.S. one-cent piece, i.e., a penny, on the powder, and heating the powder-filled die for 2.5 hours at 90° C. After cooling, the resulting disk which was amber in color, 4 mm thick and 20 mm diameter, was removed from the die. The disk was soluble in tetrahydrofuran and methyl ethyl ketone and the disk could be filed with a metal file.

A second disk was prepared as described above except that after heating for 2.5 hours at 90° C., the disk was further heated at 170° C. for 3 hours prior to removal from the die. The resultant disk which retained the image of the penny, was insoluble in tetrahydrofuran and methyl ethyl ketone, indicating that the polymer has cured, i.e., crosslinked, during heating at 170° C.

Various modifications and alterations of this invention will become apparent to those skilled in the art without departing from the scope and spirit of this invention.

We claim:

1. Normally solid, organic solvent-soluble, thermoplastic, polyethylenically-unsaturated, cellulosic polyurethane polymers comprising the polymerization product of a reaction mixture of (a) aliphatic or cycloaliphatic diol comprising sufficient ethylenically-unsaturated organic diol to permit crosslinking of the polymerization product to a solvent-insoluble state; (b) organic solvent-soluble cellulosic ether or ester having residual unreacted cellulosic hydroxyl groups; and (c) organic diisocyanate.

2. The cellulosic polyurethane polymers of claim 1 wherein said ethylenically-unsaturated diol comprises at least about 5 weight percent of said aliphatic or cycloaliphatic diol.

3. The cellulosic polyurethane polymers of claim 1 wherein said ethylenically-unsaturated diol has two primary or secondary hydroxyl groups.

4. The cellulosic polyurethane polymers of claim 1 wherein said ethylenically-unsaturated diol is a polyethylenically unsaturated diol.

5. The cellulosic polyurethane polymers of claim 1 wherein said diol is a monomeric diol having 2 to about 30 carbon atoms and which may contain up to about 14 ether oxygen atoms and amide nitrogen atoms.

6. The cellulosic polyurethane polymers of claim 1 wherein said diol is a polymeric diol having a molecular weight of up to 100,000.

7. The cellulosic polyurethane polymers of claim 1 wherein said diols are poly(oxyalkylene)diols, polyester diols, poly(caprolactone)diols, and poly(carbonate)diols.

8. The cellulosic polyurethane polymers of claim 1 wherein said ethylenically-unsaturated diols have an ethylenic unsaturation equivalent weight of less than about 1000.

9. The cellulosic polyurethane polymers of claim 1 wherein said aliphatic or cycloaliphatic diol further comprises long-chain aliphatic group modified diol.

10. The cellulosic polyurethane polymers of claim 9 wherein said long-chain aliphatic group-modified diols are the addition reaction products of a long-chain aliphatic carboxylic acid or alcohol having about 4 to 30 carbon atoms and a diepoxide.

11. The cellulosic polyurethane polymers of claim 9 wherein said long-chain aliphatic group-modified diols are the reaction product of an ethylenically-unsaturated acid and a modified epoxy resin which resin is the reaction product of an hydroxyl group-containing glycidyl ether resin and a fatty acid ester oil, the fatty acid portion of said oil having 4 to 30 carbon atoms or the reaction product of an hydroxyl group-containing glycidyl ether resin and a lower alkyl ester of a fatty acid having 4 to 30 carbon atoms.

12. The cellulosic polyurethane polymers of claim 9 wherein said long-chain aliphatic group-modified diols are the reaction product of an ethylenically-unsaturated organic acid and a modified epoxy resin which resin is the reaction product of a hydroxyl group-containing glycidyl ether resin and a long-chain aliphatic isocyanate having 4 to 30 carbon atoms.

13. The cellulosic polyurethane polymers of claim 1 wherein said diol is pentaerythritol diacrylate or the reaction product of the diglycidyl ether of Bisphenol A and acrylic acid or propionic acid.

14. The cellulosic polyurethane polymers of claim 9 wherein said long-chain aliphatic group modified diol is the reaction product of the diglycidyl ether of Bisphenol A, acrylic acid, and stearic acid.

15. The polyurethane of claim 1 wherein said cellulose ether or ester can be represented by the formula

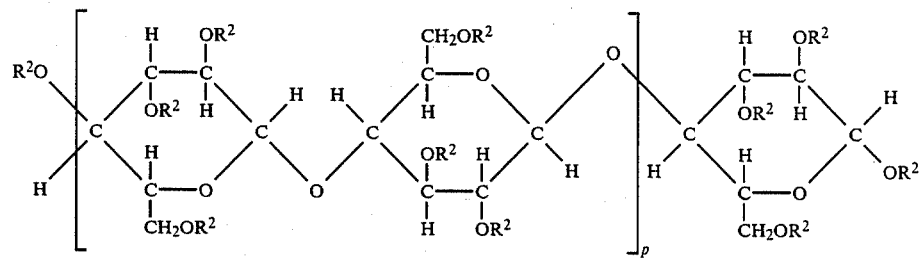

wherein each $R^2$ is independently selected from —H, —$R^3$,

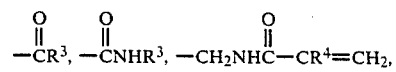

-continued

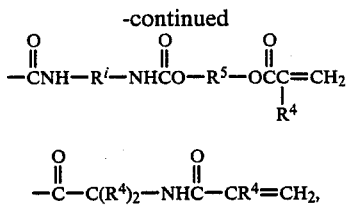

wherein
- $R^3$ is (1) a saturated aliphatic group which may be branched or cyclic having 1 to 20 carbon atoms and up to 3 non-adjacent oxygen atoms, (2) an ethylenically-unsaturated organic group which may be branched or cyclic having 2 to 20 carbon atoms and which may be substituted with acryloyloxy and acrylamido groups, or an aryl group having 6 to 10 carbon atoms; $R^4$ is hydrogen or a methyl group; and 0.01 to 30 weight percent of the $-OR^2$ groups are hydroxyl, $R^5$ is an alkylene group having 2 to 12 carbon atoms, and $R^i$ is a diisocyanate residue; and
- p is a number having a value from about 5 to 250;

said cellulose ether or ester has a viscosity of about 0.01 to 60 and contains 0.01 to 30 weight percent unreacted hydroxyl units.

16. The cellulosic polyurethane polymers of claim 1 wherein said cellulose ester is the reaction product of a cellulose with at least one saturated or unsaturated organic acid halide, saturated or unsaturated organic acid anhydride, saturated or unsaturated organic isocyanate, or inorganic acid.

17. The cellulosic polyurethane polymers of claim 1 wherein said cellulose ester is the reaction product of cellulose and an ethylenically unsaturated azlactone.

18. The cellulosic polyurethane polymers of claim 1 wherein said cellulose ether is the reaction product of a cellulose with at least one haloalkane, haloalkylarene, haloalkoxyalkane, haloalkyl acylate, alkylene oxide, or N-methylolacrylamide.

19. The cellulosic polyurethane polymers of claim 1 wherein said cellulose ether is cellulose acetate propionate, cellulose acetate butyrate, or an ethyl ether-substituted cellulose.

20. The cellulosic polyurethane polymers of claim 1 wherein said organic diisocyanate is selected from linear, branched, and cyclic aliphatic, aromatic, and heterocyclic diisocyanates.

21. The cellulosic polyurethane polymers of claim 1 wherein said organic diisocyanate is isophorone diisocyanate.

22. The cellulosic polyurethane polymers of claim 1 wherein said reaction product further comprises primary or secondary aliphatic or aromatic diamine or aliphatic or cycloaliphatic dithiol.

23. The cellulosic polyurethane polymers of claim 1 wherein said aliphatic or cycloaliphatic diol is present in an amount of about 30 to 90 weight percent of which about 5 to 100 weight percent is ethylenically-unsaturated diol, said cellulose ether or ester is present in an amount of about 5 to 33 weight percent, and said organic diisocyanate is present in an amount that provides about 0.5 to 1.2 isocyanate equivalents per total equivalent weight of hydroxy groups present in said diol.

24. The cellulosic polyurethane polymers of claim 1 wherein said aliphatic or cycloaliphatic diol is present in an amount of about 30 to 60 weight percent of which about 5 to 100 weight percent is ethylenically-unsaturated diol, said cellulose ether or ester is present in an amount of about 9 to 30 weight percent, and said organic diisocyanate is present in an amount that provides about 0.8 to 1 isocyanate equivalents per total equivalent weight of hydroxy groups present in said diol.

25. The cellulosic polyurethane polymers of claim 9 wherein said ethylenically-unsaturated diol is present in an amount of about 30 to 50 weight percent, said long-chain aliphatic group-modified diol is present in an amount of about 9 to 30 weight percent, said cellulose ether or ester is present in an amount of about 8 to 25 weight percent, and said organic diisocyanate is present in an amount that provides about 0.8 to 1 isocyanate equivalents per total equivalent weight of hydroxy groups present in said diol.

26. The cellulosic polyurethane polymers of claim 25 wherein said ethylenically-unsaturated diol is the reaction product of the diglycidyl ether of Bisphenol A and acrylic acid, the long-chain aliphatic group-modified diol is the reaction product of the diglycidyl ether of Bisphenol A, acrylic acid and stearic acid, the cellulosic ester is cellulose acetate butyrate, and the organic diisocyanate is isophorone diisocyanate.

27. The cellulosic polyurethane polymers of claim 1 wherein said ethylenically-unsaturated diol is a mixture that is the reaction product of diglycidylether of Bisphenol A, acrylic acid, stearic acid; the cellulosic ester is cellulose acetate butyrate; and the organic diisocyanate is isophorone diisocyanate.

28. A normally solid, organic solvent-soluble, thermoplastic, polyethylenically-unsaturated, cellulosic polyurethane polymer comprising one or more cellulose ether or ester segments, $R^c$, one or more alkylene moieties, $R^d$, having at least two carbon atoms and which can be substituted, or interrupted by ether oxygen atoms, ester groups, and phenylene groups, and two or more residues of diisocyanates, $R^i$, with the proviso that said alkylene moieties contain sufficient ethylenic unsaturation that said polymer can be crosslinked to a solvent insoluble state.

29. The cellulosic polyurethane polymers of claim 28, said polymers comprising one or a pluality of units represented by formula I:

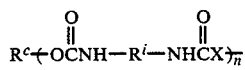

wherein
- each $R^c$ is independently a cellulose ether or ester residue of an organic solvent-soluble cellulose ether or ester, said residue containing an amount of unreacted hydroxyl groups equal to about 0.01 to 30 weight percent, minus an amount of hydroxyl groups equal to n;
- each $R^i$ is independently the residue of an organic diisocyanate devoid its two isocyanate groups; and
- n is a number having a value of at least 1;

and one or a plurality of units represented by formula II:

wherein $R^i$ is defined as above and each $R^d$ is independently the hydroxyl-free, amino-free, or thiol-free residue of an aliphatic or cycloaliphatic diol having a molecular weight of from 62 to 100,000 or more, aliphatic, cycloaliphatic, or aromatic diamine having a molecular weight of from 60 to 100,000 or more, or aliphatic or cycloaliphatic dithiol having a molecular weight of from 94 to 100,000, termed precursor diol, diamine, or dithiol, which residue is devoid two hydroxy groups, two amino groups, or two thiol groups, respectively, and which can be substituted, for example, with ethylenically-unsaturated groups, and/or hydrocarbyl groups having 4 to 30 carbon atoms, with the proviso that $R^d$ is derived from a sufficient amount of the ethylenically-unsaturated diol that the polymer can be crosslinked to an organic solvent-insoluble state; each X is independently —O—, —S—, or —NR— wherein R is hydrogen or lower alkyl having 1 to 6 carbon atoms.

30. The cellulosic polyurethane polymers of claim 28 wherein said cellulose ether or ester segments contain units represented by the formula -continued

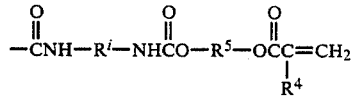

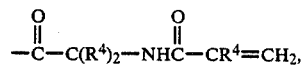

—$SO_2R^4$, and —$NO_2$, wherein $R^3$ is (1) a saturated aliphatic group which may be branched or cyclic having 1 to 20 carbon atoms and up to 3 non-adjacent oxygen atoms, (2) an ethylenically-unsaturated organic group which may be branched or cyclic having 2 to 20 carbon atoms and which may be substituted with acryloyloxy and acrylamido groups, or (3) an aryl group having 6 to 10 carbon atoms; $R^4$ is hydrogen or a methyl group; $R^5$ is an alkylene group having 2 to 12 carbon atoms, and $R^i$ is a diisocyanate residue.

31. The cellulosic polyurethane polymers of claim 28 wherein $R^i$ is

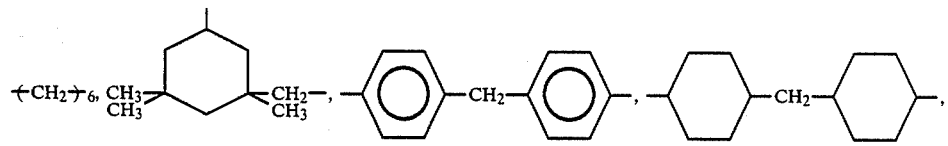

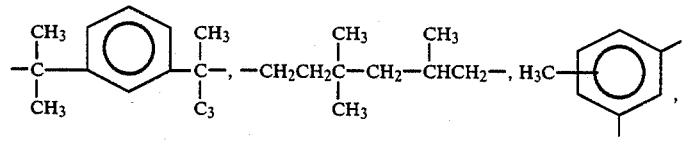

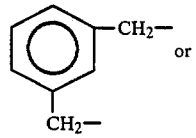

or

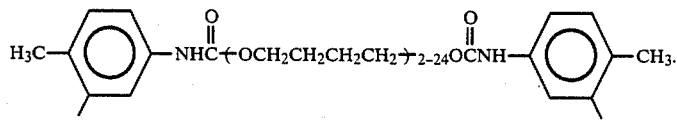

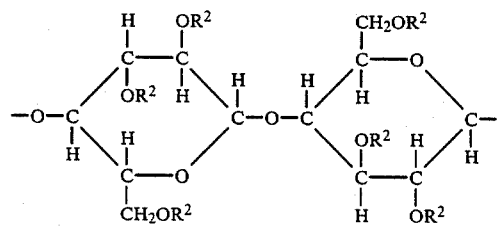

wherein each $R^2$ is independently selected from —H, —$R^3$,

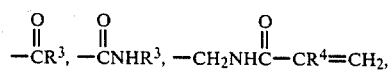

32. The cellulosic polyurethane polymers of claim 28 wherein $R^d$ is

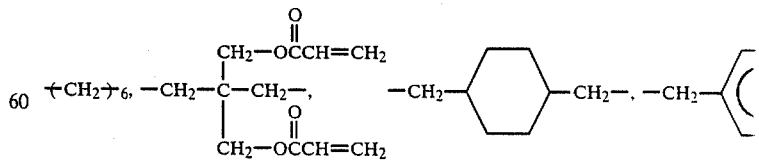

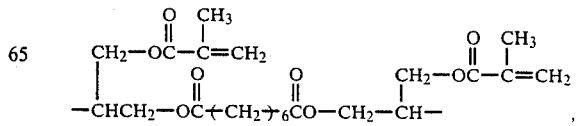

-continued

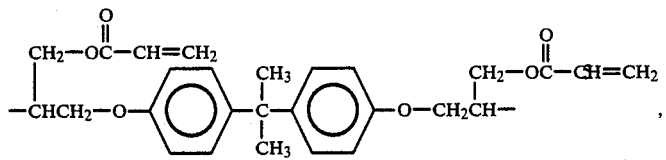

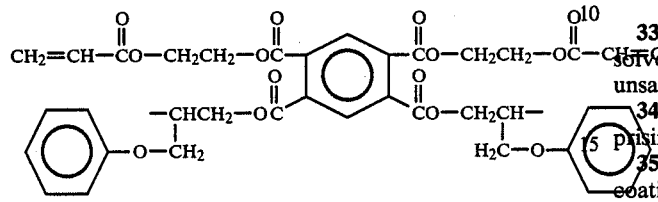

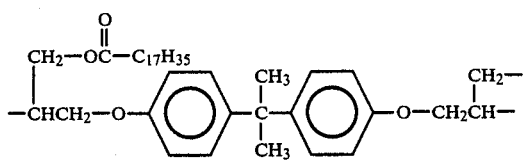

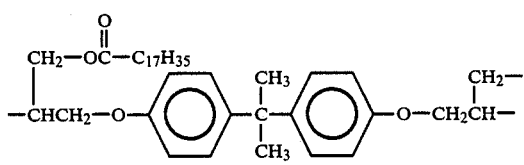

—CH₂CH₂CH₂—O—CH₂CH₂CH₂—,
—CH₂CH₂—O—CH₂CH₂—,

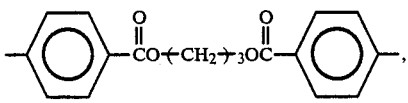

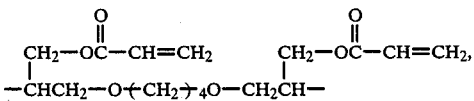

-continued

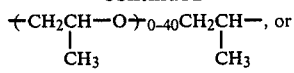

33. A coating composition comprising an organic solvent solution of the thermoplastic, polyethylenically-unsaturated cellulosic polyurethane of claim 28.

34. The coating composition of claim 33 further comprising nitrocellulose.

35. A coated article comprising a substrate having a coating thereon, said coating comprising the cellulosic polyurethane polymer of claim 28.

36. The coated article of claim 35 wherein said coating is crosslinked.

37. The coated article of claim 35 wherein said substrate is wood.

38. A method for providing a substrate with a coating comprising applying to said substrate an organic solvent solution of the cellulosic polyurethane polymer of claim 28 and allowing said organic solvent to evaporate.

39. The method of claim 38 further comprising working said coating after evaporation of said organic solvent.

40. The method of claim 39 wherein said working comprises sanding, polishing, buffing, and solvent removal of said coating.

41. The method of claim 38 further comprising effecting crosslinking of said polyurethane polymer after evaporation of said organic solvent.

42. A shaped article comprising the cellulosic polyurethane polymer of claim 28.

43. A method for preparing a shaped article comprising molding or extruding the cellulosic polyurethane polymer of claim 28.

44. The method of claim 43 further comprising working said shaped article.

45. The method of claim 43 further comprising effecting crosslinking of said cellulosic polyurethane polymer.

* * * * *

UNITED STATES PATENT AND TRADEMARK OFFICE
CERTIFICATE OF CORRECTION

PATENT NO. : 4,855,184

DATED : August 8, 1989

INVENTOR(S) : Thomas P. Klun, et al

It is certified that error appears in the above-identified patent and that said Letters Patent is hereby corrected as shown below:

Col. 40, line 57, should read:

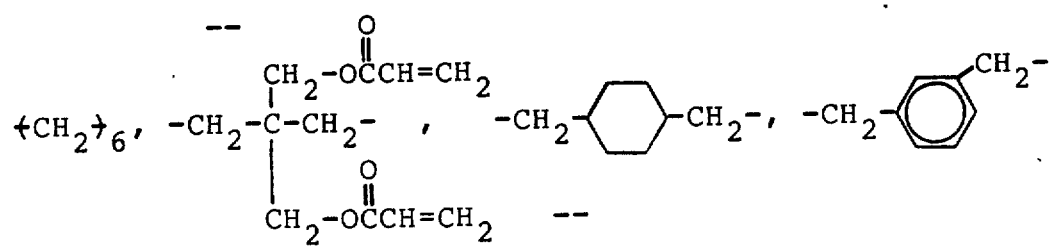

Signed and Sealed this

Twenty-eighth Day of August, 1990

*Attest:*

HARRY F. MANBECK, JR.

*Attesting Officer*   *Commissioner of Patents and Trademarks*